(12) United States Patent
Patel et al.

(10) Patent No.: US 11,631,250 B2
(45) Date of Patent: Apr. 18, 2023

(54) BOWLING LANE ERROR DETECTION

(71) Applicant: Amish Patel, San Dimas, CA (US)

(72) Inventors: Mahesh Patel, Upland, CA (US);
Amish Patel, Chino Hills, CA (US);
Anish Patel, Upland, CA (US)

(73) Assignee: Amish Patel, San Dimas, CA (US)

( * ) Notice: Subject to any disclaimer, the term of this patent is extended or adjusted under 35 U.S.C. 154(b) by 435 days.

(21) Appl. No.: 15/930,400

(22) Filed: May 12, 2020

(65) Prior Publication Data

US 2021/0357650 A1    Nov. 18, 2021

(51) Int. Cl.
| | |
|---|---|
| G06V 20/40 | (2022.01) |
| A63D 5/04 | (2006.01) |
| G01P 3/38 | (2006.01) |
| G06V 20/52 | (2022.01) |

(52) U.S. Cl.
CPC ............... *G06V 20/42* (2022.01); *A63D 5/04* (2013.01); *G01P 3/38* (2013.01); *G06V 20/52* (2022.01); *G06V 20/44* (2022.01)

(58) Field of Classification Search
CPC ...... A63D 5/04; A63D 1/00; A63D 2005/042; A63D 2005/048; A63D 3/00; A63D 5/00; A63D 9/00; G06T 2207/30241; G06T 7/20; G06T 7/254; G06T 11/60; G06T 2207/10024; G06T 2207/10028; G06T 2207/20084; G06T 5/002; G06T 5/50; G06T 7/11; G06T 7/194; G06T 7/73
See application file for complete search history.

(56) References Cited

U.S. PATENT DOCUMENTS

| | | | |
|---|---|---|---|
| 4,827,412 A | * | 5/1989 | Form ....................... A63D 5/04 473/69 |
| 5,101,354 A | | 3/1992 | Mowers et al. |
| 5,372,551 A | | 12/1994 | McCarthy et al. |
| 5,683,080 A | * | 11/1997 | Vaioli ...................... A63D 5/04 473/69 |
| 6,524,192 B1 | | 2/2003 | Tsujita et al. |

(Continued)

FOREIGN PATENT DOCUMENTS

| | | |
|---|---|---|
| GB | 2075231 A | 11/1981 |
| JP | H06182019 A | 7/1994 |

(Continued)

OTHER PUBLICATIONS

International Search Report and Written Opinion dated Aug. 3, 2021 in International Application No. PCT/US2021/031174, 14 pages.

*Primary Examiner* — Alex Kok S Liew
(74) *Attorney, Agent, or Firm* — Procopio, Cory, Hargreaves & Savitch LLP

(57) ABSTRACT

An error detection system for notifying maintenance personnel of errors in a bowling lane operation may include a camera, artificial light source (optional), a computer that sends an output signal. The output signal may be a signal to provide notification to maintenance personnel to fix the error or an electrical signal to the pinsetter or ball return unit to manipulate operation of the same to prevent further damage. In this manner, interruptions and delays to bowlers will be minimized because maintenance personnel is immediately notified of any errors and can resolve the errors before the bowler realizes the error.

11 Claims, 19 Drawing Sheets

(56) References Cited

U.S. PATENT DOCUMENTS

| | | | |
|---|---|---|---|
| 2005/0272511 A1* | 12/2005 | Bouchard | ............... A63D 9/00 |
| | | | 473/70 |
| 2005/0288115 A1 | 12/2005 | Popielarz et al. | |
| 2009/0280916 A1* | 11/2009 | Zambelli | ................. A63D 1/00 |
| | | | 463/7 |
| 2010/0197418 A1 | 8/2010 | Uto | |

FOREIGN PATENT DOCUMENTS

| JP | 3045386 U | 11/1997 |
|---|---|---|
| JP | H11333044 A | 12/1999 |
| JP | 2005170658 A | 6/2005 |
| JP | 2006296855 A | 11/2006 |

* cited by examiner

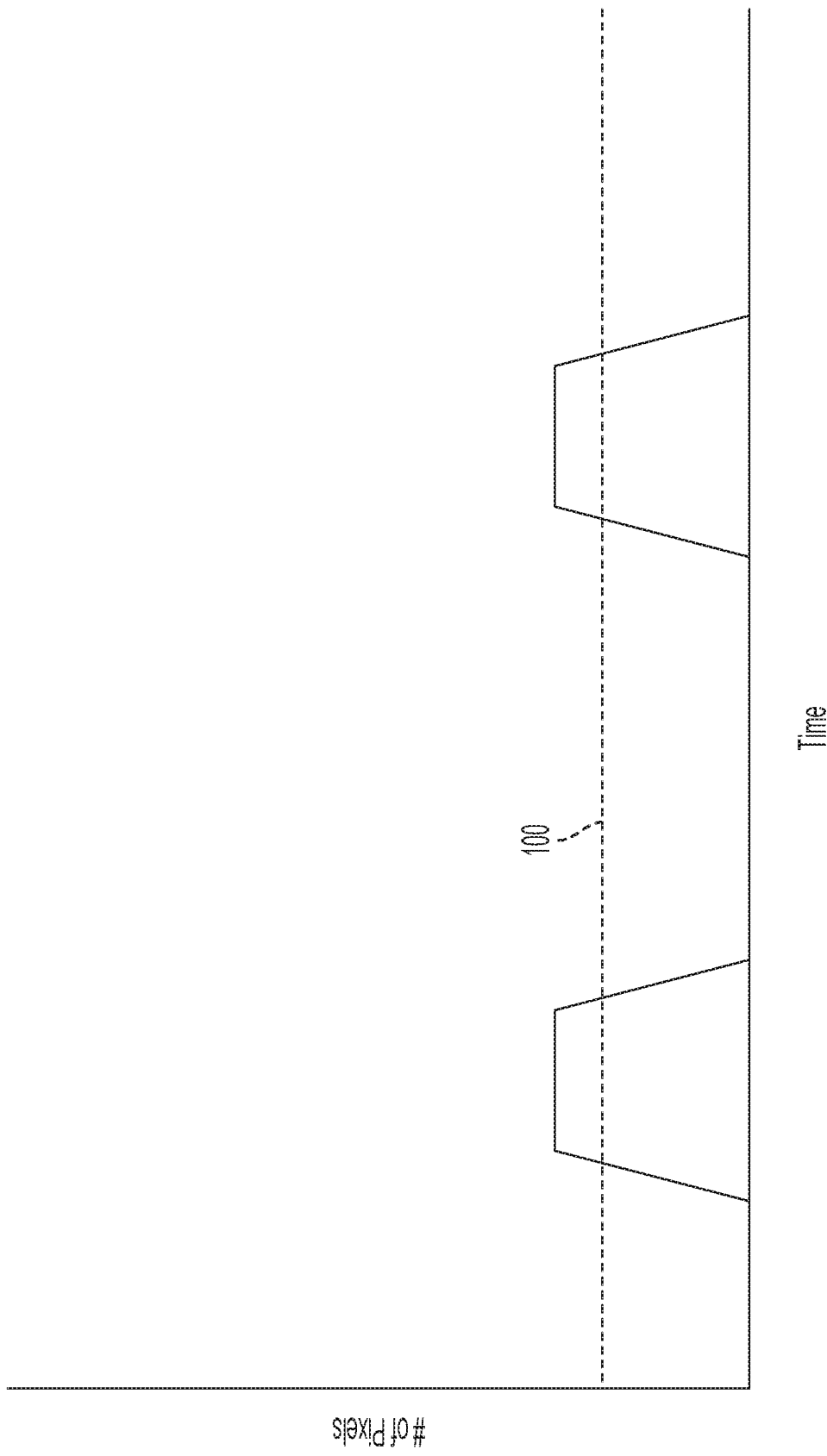

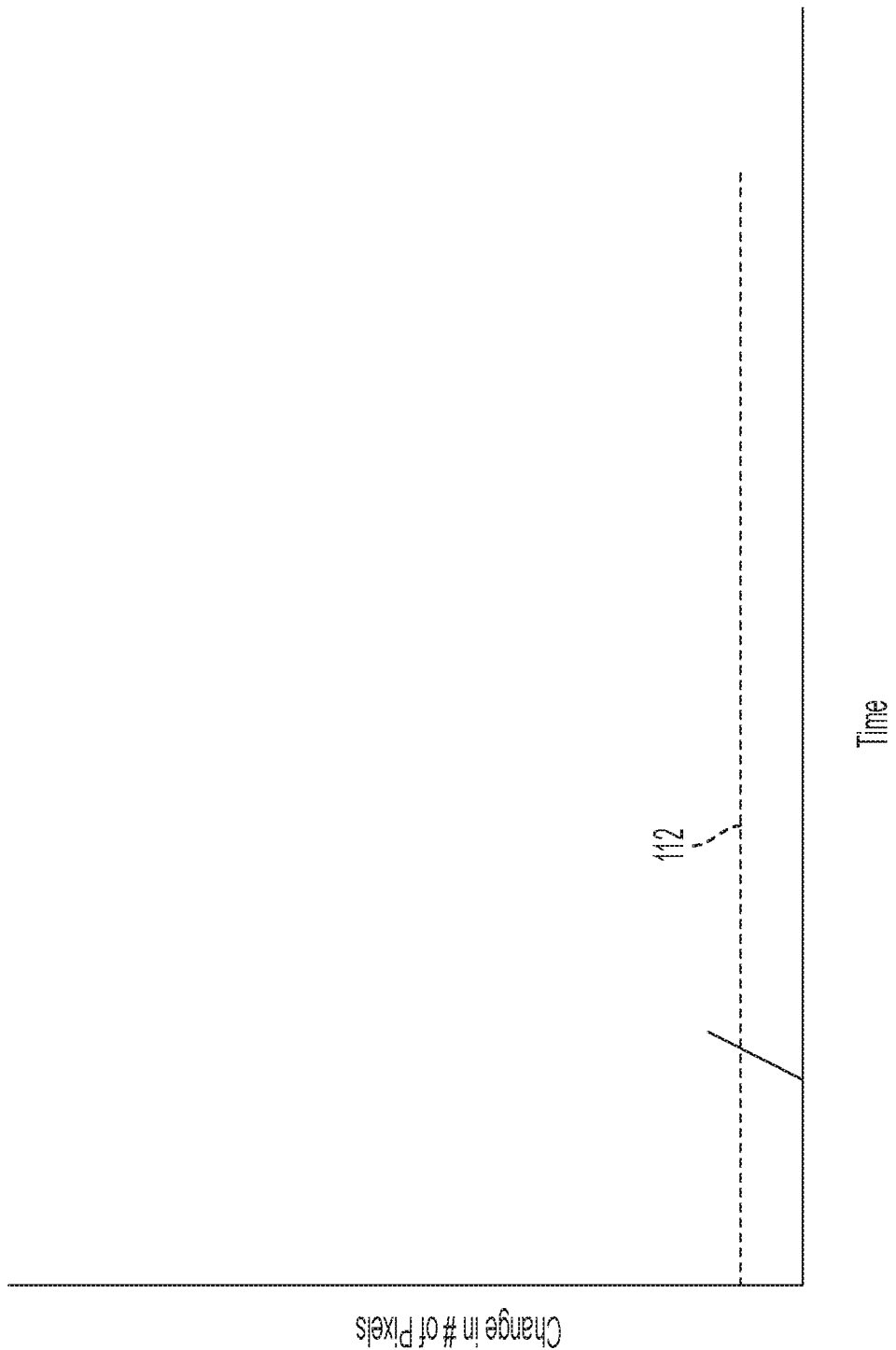

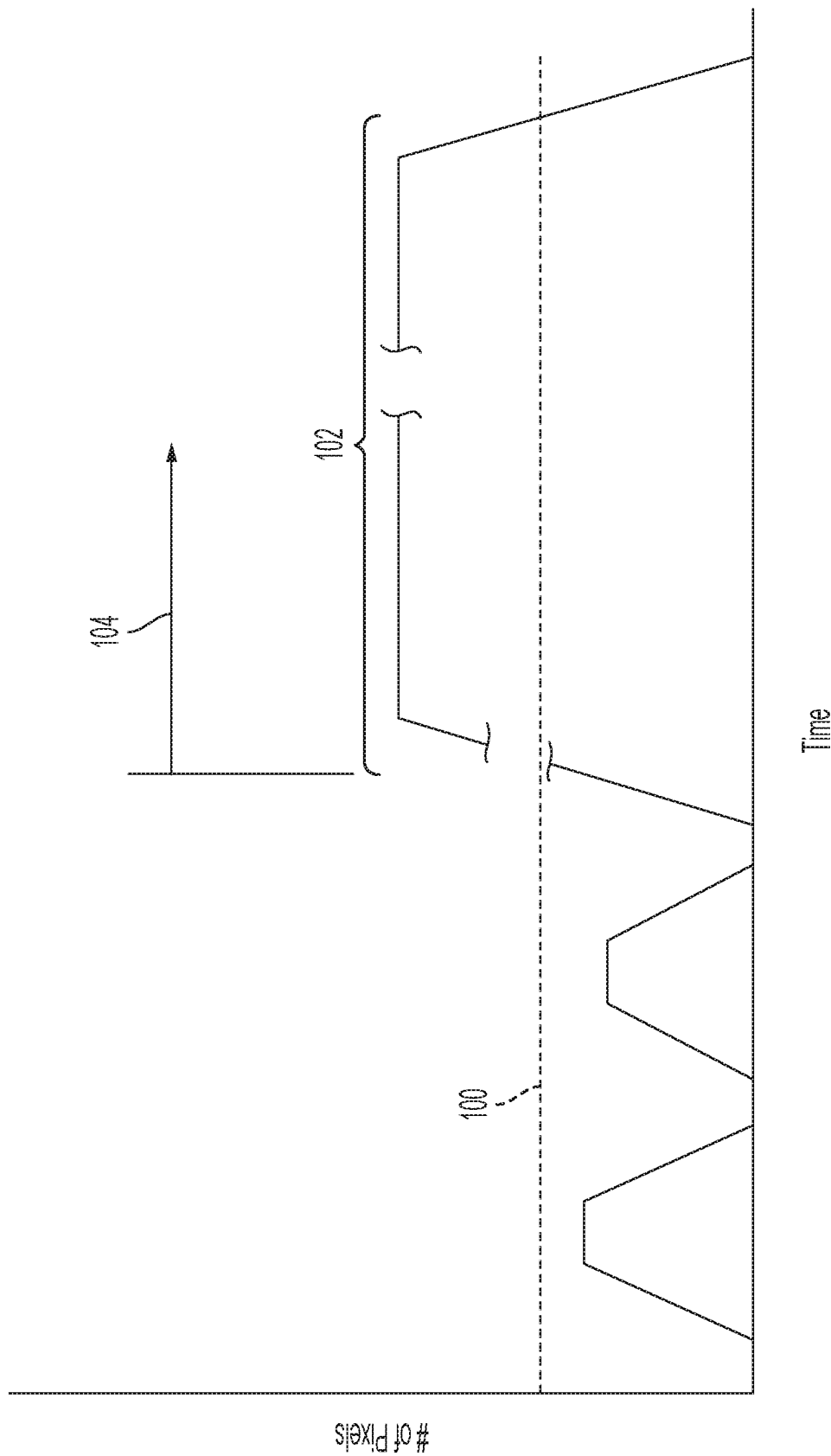

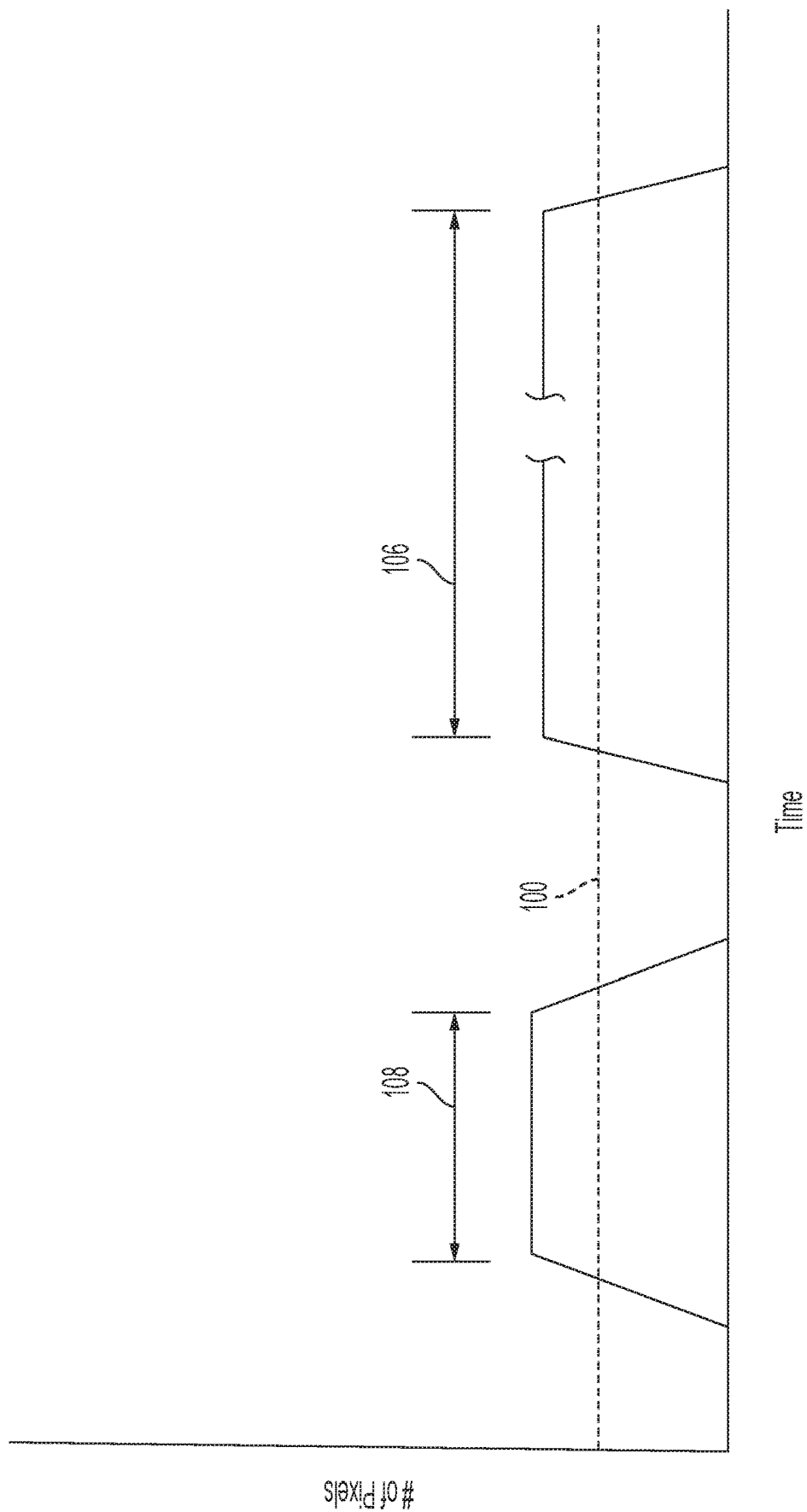

| Pin # | 7 | 4 | 2 | 1 | 8 | 5 | 3 | 9 | 6 | 10 |
|---|---|---|---|---|---|---|---|---|---|---|
| Pin Color | B | G | G | W | B | W | B | W | W | R |

FIG. 11

| Pin # | 7 | 4 | 2 | 1 | 8 | 5 | 3 | 9 | 6 | 10 |
|---|---|---|---|---|---|---|---|---|---|---|
| Pin Color | B | G | G | W | B | W | B | X | X | X |

FIG. 12

| Pin # | 7 | 4 | 2 | 1 | 8 | 5 | 3 | 9 | 6 | 10 |
|---|---|---|---|---|---|---|---|---|---|---|
| Pin Color | X | X | G | W | X | W | B | X | X | X |

FIG. 13

| Pin # | 7 | 4 | 2 | 1 | 8 | 5 | 3 | 9 | 6 | 10 |
|---|---|---|---|---|---|---|---|---|---|---|
| Pin Color | | | W | W | | | R | | | |

FIG. 14

| Pin # | 7 | 4 | 2 | 1 | 8 | 5 | 3 | 9 | 6 | 10 |
|---|---|---|---|---|---|---|---|---|---|---|
| Pin Color | B | B | W | W | B | G | R | W | G | W |

FIG. 15

BOWLING LANE ERROR DETECTION

CROSS-REFERENCE TO RELATED APPLICATIONS

Not Applicable.

STATEMENT RE: FEDERALLY SPONSORED RESEARCH/DEVELOPMENT

Not Applicable.

BACKGROUND

The various aspects described herein relate to an error detection system of various mechanical operations of a bowling lane.

A bowling lane will have a pin spotter and a ball return. These mechanical systems function to stop the bowling ball, return the bowling ball to the bowler, set the bowling pins and reset them when needed.

The pin spotter may have a cushion that stops the ball. Also, the pin spotter may have a sweep that removes fallen pins from a pin deck and adjacent gutters into the pit. The pit may be behind the pin deck. Also, the pit may have a rotating belt (i.e. carpet) that carries the fallen pins to a pin elevator. The pin elevator lifts the bowling pins up and a distributor may direct each of the pins into a bin of a bin and shuttle assembly. A table underneath the bin and shuttle assemblies receives 10 pins from the bin and shuttle assemblies to spot the bowling pins on the pin spots of the pin deck.

With regard to the bowling ball, the rotating belt and the cushion urges the bowling ball into a side hole where the ball return mechanism returns the bowling ball to the bowler. The bowling ball is lifted up to an elevation high enough to permit gravity to return the ball to the ball return located at the approach (i.e., the bowler at the other end of the bowling lane).

These operations should occur automatically and without malfunction. However, the mechanical devices that manage the bowling pins and the bowling balls sometimes malfunction. Accordingly, there is a need in the art for a method and device for addressing these malfunctions.

BRIEF SUMMARY

The various aspects of the method and apparatus described herein relate to an error detection system for a bowling lane of a bowling alley. The error detection system provides an early warning to maintenance crews of the bowling alley so that they can fix the error prior to the bowler perceiving the occurrence of the error. By way of example and not limitation, one or more cameras can be positioned at various locations along the bowling lane, pinsetter, and ball return system. The cameras provide video feeds to a computer regarding various points of interest of the bowling lane, pinsetter and the ball return system. The computer analyzes the light levels of the area of interest on a pixel by pixel basis. Based on the light levels of the pixels and the changes in the light levels of the pixels, the computer can determine various error conditions of the bowling lane, pinsetter, and the ball return system. Once the computer determines that an error has occurred, the computer may send an output signal in the form of notification to maintenance personnel to fix the error. Also, the output signal may be operative to operate the machine (e.g., turn off a motor) to prevent any further damage or slow down in the operation of the bowling lane.

More particularly, a bowling alley operative to detect when a pinsetter is jammed is disclosed. The alley may comprise a bowling lane; the pinsetter positioned above the lane at an end portion of the bowling lane; a video camera positioned adjacent to the pinsetter to detect malfunctions of the pinsetter; a computer in data communication with the video camera to receive light levels of a field of view of the video camera, a processor for processing the light levels of a portion of the field of view of the video camera and determining when the pattern of light levels indicate a malfunction of the pinsetter, the computer operative to send an output signal; a light, vibration or speaker in communication with the computer, and the computer operative to activate the light, vibration or speaker when the output signal is received by the light, vibration or speaker to indicate a malfunction of the pinsetter.

The video camera may be disposed above the pinsetter so that a transfer belt (e.g., distributor) disposed between a pin elevator (e.g, pin elevator or pinwheel) is within the field of view of the video camera. The upper table may be a pin rack or a pin turret.

The computer may processes the pixels only within a bounded box which is smaller than the field of view of the video camera. The bounded box may be larger than the transfer belt.

The light levels within the bounded box may be converted to a first value or a second value. The computer may transmit the output signal only if a sum of the number of pixels associated with the first value is greater than a threshold number. The threshold number may be associated with a size of one bowling pin.

In another aspect, a bowling alley may be operative to detect when a bowling ball is jammed. The alley may comprise a bowling lane; a first sensor positioned adjacent to a lane of the bowling alley to detect a bowling ball being rolled; a second sensor positioned adjacent a bowling ball return rail to determine if the bowling ball detected by the first sensor is returned to a ball return; a computer in data communication with the first sensor to receive a detect signal from the sensor and in data communication with the second sensor to receive a return signal from the second sensor, a processor of the computer sends an output signal when a number of detect signals from the first sensor is greater than a number of return signals from the second sensor by one for at least 5 seconds or by two for at least five seconds; a light, vibration or speaker in communication with the computer, and the computer operative to activate the light, vibration or speaker when the output signal is received by the light, vibration or speaker to indicate when a bowling ball is jammed.

In another aspect, a bowling alley may be operative to detect when a bowling ball is jammed in a ball return. The alley may comprise a bowling lane; a sensor positioned adjacent to a ramp of a ball return; a computer in data communication with the sensor to receive a detect signal from the sensor, a processor of the computer sends an output signal the detect signal lasts for more than 5 seconds; a light, vibration or speaker in communication with the computer, and the computer operative to activate the light, vibration or speaker when the output signal is received by the light, vibration or speaker to indicate when a bowling ball is jammed in a ball return.

In another aspect, a bowling alley may be operative to detect when a pinsetter is jammed. The alley may comprise a bowling lane; the pinsetter positioned above the lane at an end portion of the bowling lane, the pinsetter having an upper table (bin and shuttle assemblies) for receiving bowling pins from a distributor and a lower table (setting table) traverseable between an up position to receiving bowling pins from the upper table and a down position to place the bowling pins in the pin spots of the pin deck; a sensor positioned adjacent to the upper table to detect any movement greater than a threshold distance; a computer in data communication with the sensor to receive distance data from the sensor, a processor for processing the distance data and determining a malfunction has occurred when the distance data is above a threshold distance, the computer operative to send an output signal when the malfunction has occurred; a light, vibration or speaker in communication with the computer, and the computer operative to activate the light, vibration or speaker when the output signal is received by the light, vibration or speaker to indicate a malfunction of the pinsetter.

In another aspect, a bowling alley may be operative to detect a color of a bowling pin. The alley may comprise a bowling lane; an optical color camera disposed adjacent to a lane and directed at a pin deck; a computer in data communication with the video camera to receive color information about the colored pins, a processor for processing the color data from the optical color camera and determining the color of the pins that have fallen and are still standing, the computer operative to send an output signal regarding the colors of the standing and fallen pins; a display in communication with the computer, and the computer operative to display the color of the fallen and standing bowling pins.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2A is a graph of a computer detecting a bowling ball traveling along a track of a ball return system;

FIG. 3A is a graph of a computer detecting unwanted movement of a bin and shuttle assembly;

FIG. 7A is a graph of a computer detecting the pin jam error;

FIG. 10A is a graph of a computer detecting an error with the ball return unit;

FIG. 11 is a table illustrating pin positions and colors of the pins in those pin positions;

FIG. 12 is a table illustrating which pins were knocked down after a first ball was thrown;

FIG. 13 is a table illustrating which pins were knocked down after a second ball was thrown;

FIG. 14 illustrates pin positions and the expected colors of the pins in those pin positions after the first ball is thrown down the lane;

FIG. 15 illustrates pin positions and the expected colors of the pins in those pins positions after the second ball is thrown down the lane;

DETAILED DESCRIPTION

Figure 1:
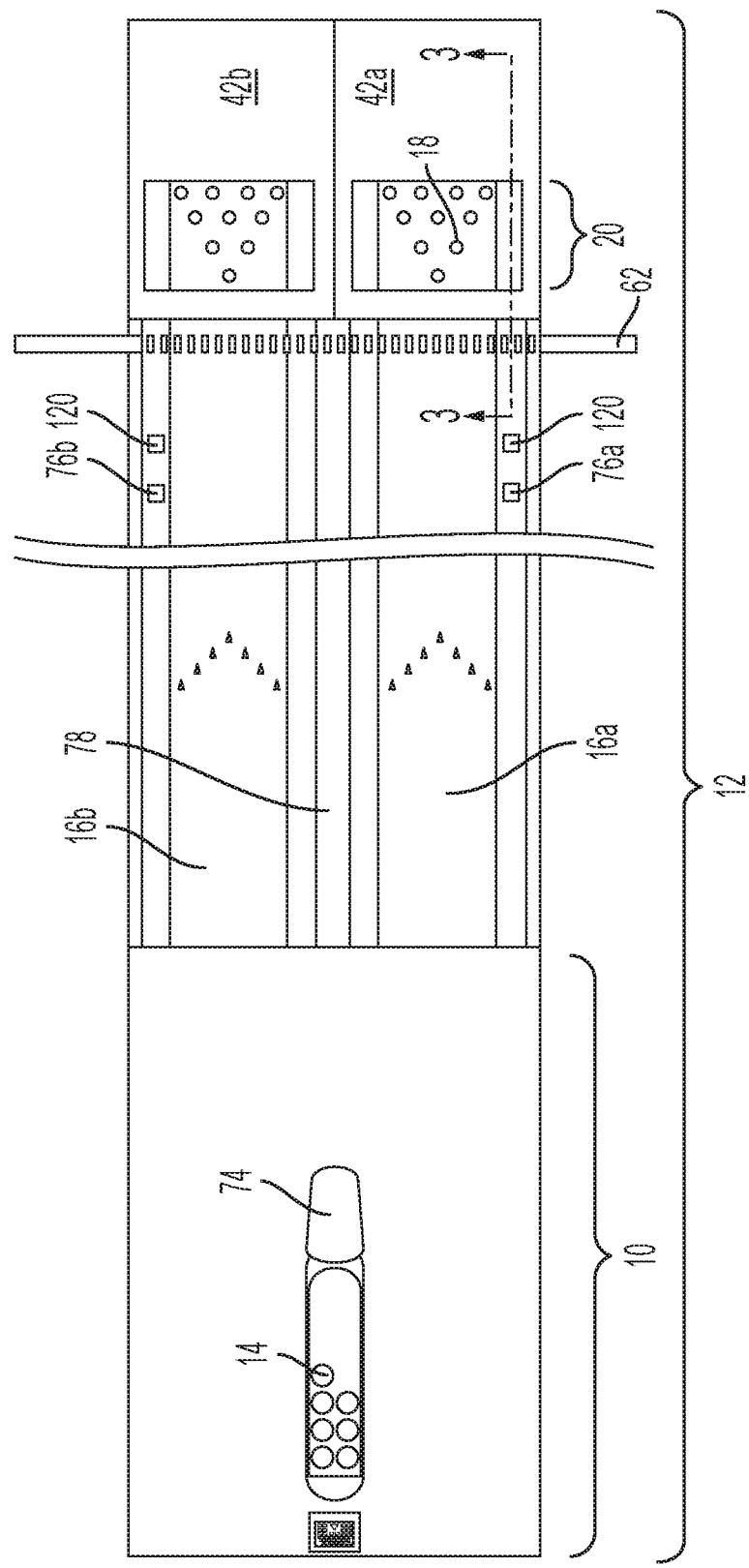
FIG. 1 is a top view of a bowling lane.

Referring now to the drawings, a method and system for detecting errors of a ball return system and a pinsetter 42 through the use of a camera 40, computer 46 and an output signal 47 is discussed. This allows a maintenance crew (e.g., mechanic) to fix the problem while the bowler is bowling before the bowler perceives a delay in the game. For example, the camera 40 (see FIG. 5) may monitor a distributor 36 (see FIGS. 4, 4A, 4B and 5) of the pinsetter 42 (see FIG. 5). As shown in FIG. 5A, the video feed of the camera 40 may be sent to the computer 46 which processes light levels of each pixel of an area of interest within the camera's field of view 41 to determine whether a pinned jam error has occurred with the pinsetter 42. Additionally, as shown in FIG. 2, another camera 40 may continuously monitor a section of the ball return system 43 to ensure that every time a bowling ball 14 has been thrown down a bowling lane 16 (see FIG. 1), the bowling ball 14 is returned to the ball return unit 74 located at the approach section 10 of the bowling lane 16 in a timely manner.

Figure 2:
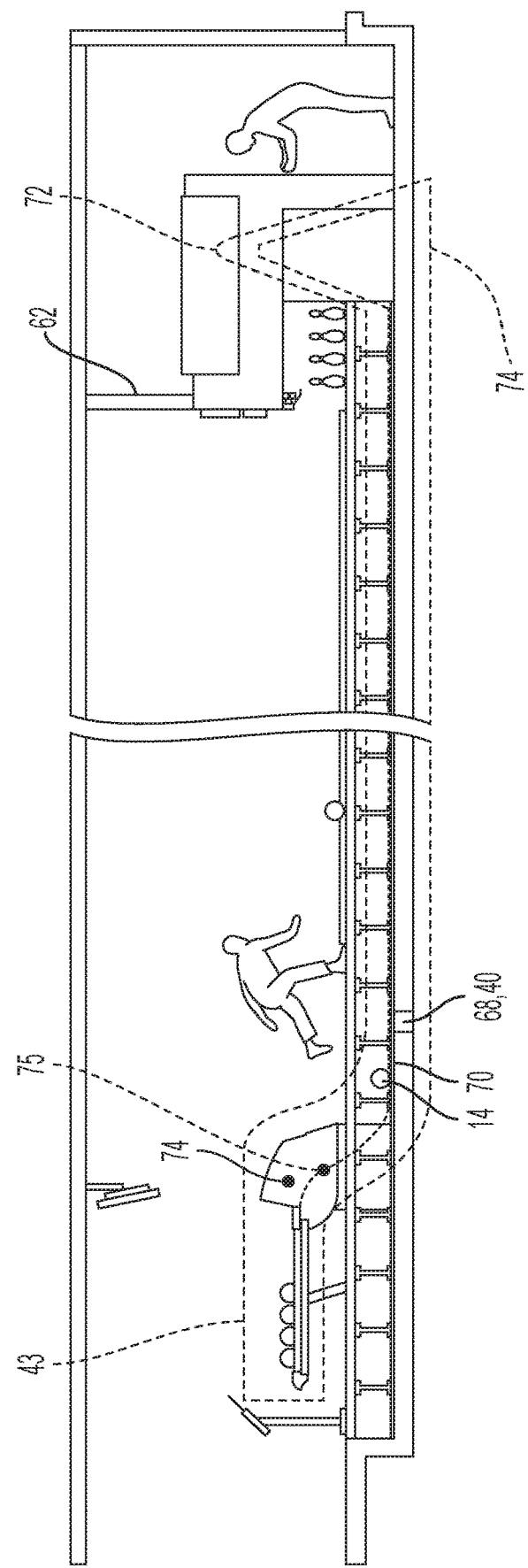
FIG. 2 is a side view of the bowling lane shown in FIG. 1.
Figure 10:
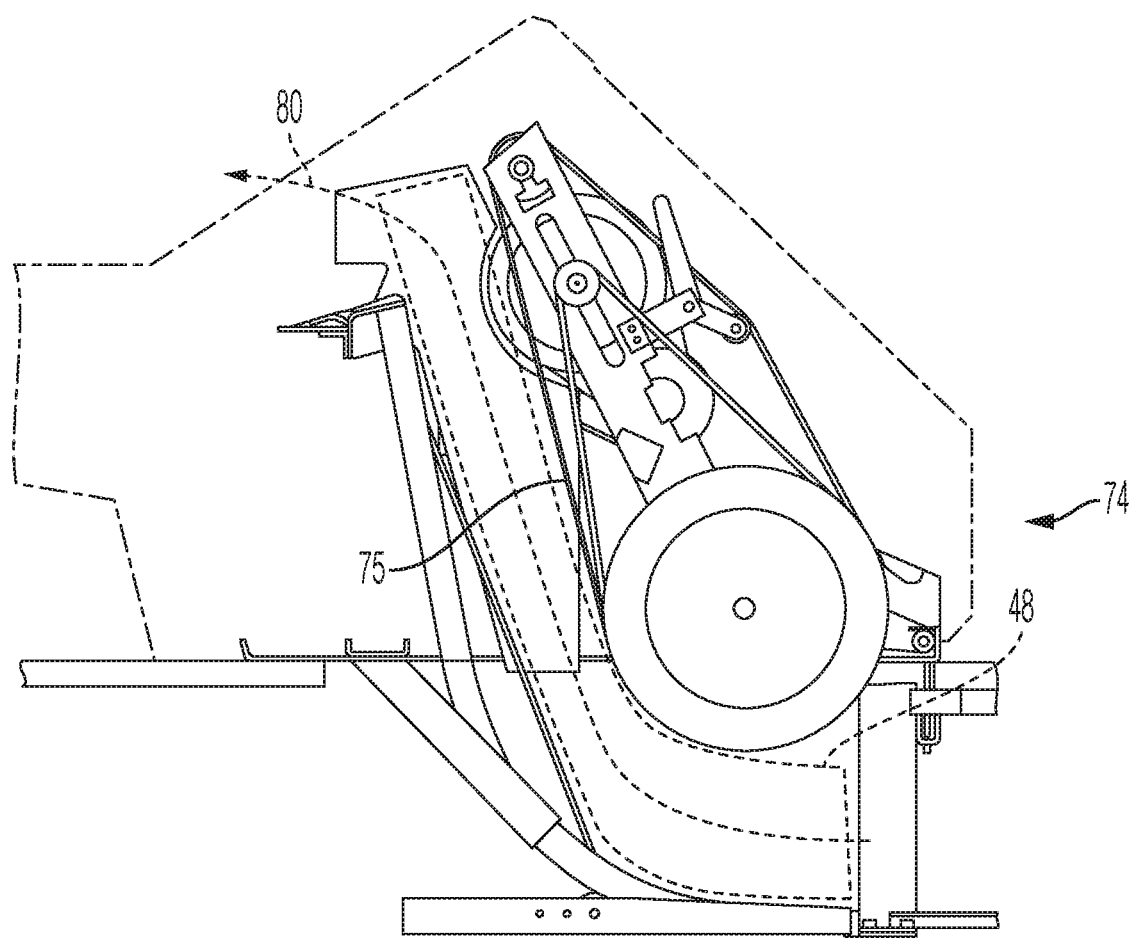
FIG. 10 illustrates a ball return unit located adjacent an approach section of the bowling lane.
Figure 10:
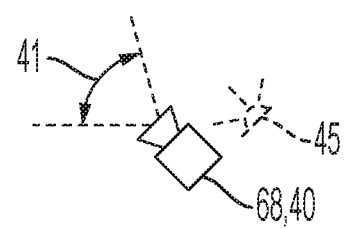

Additionally, as shown in FIGS. 2 and 10, at the ball return unit in the approach section 74, a belt system normally lifts the ball 14 up into the ball return unit 74. However, sometimes the belt 75 does not fully lift the ball 14 to the bowling ball rack of the ball return unit 74. Another camera 40 may be positioned so that the belt section 75 of the ball return unit 74 is within the camera's field of view 41. The camera monitors whether the ball 14 has lifted up to the bowling ball rack of the ball return unit 74.

Figure 3:
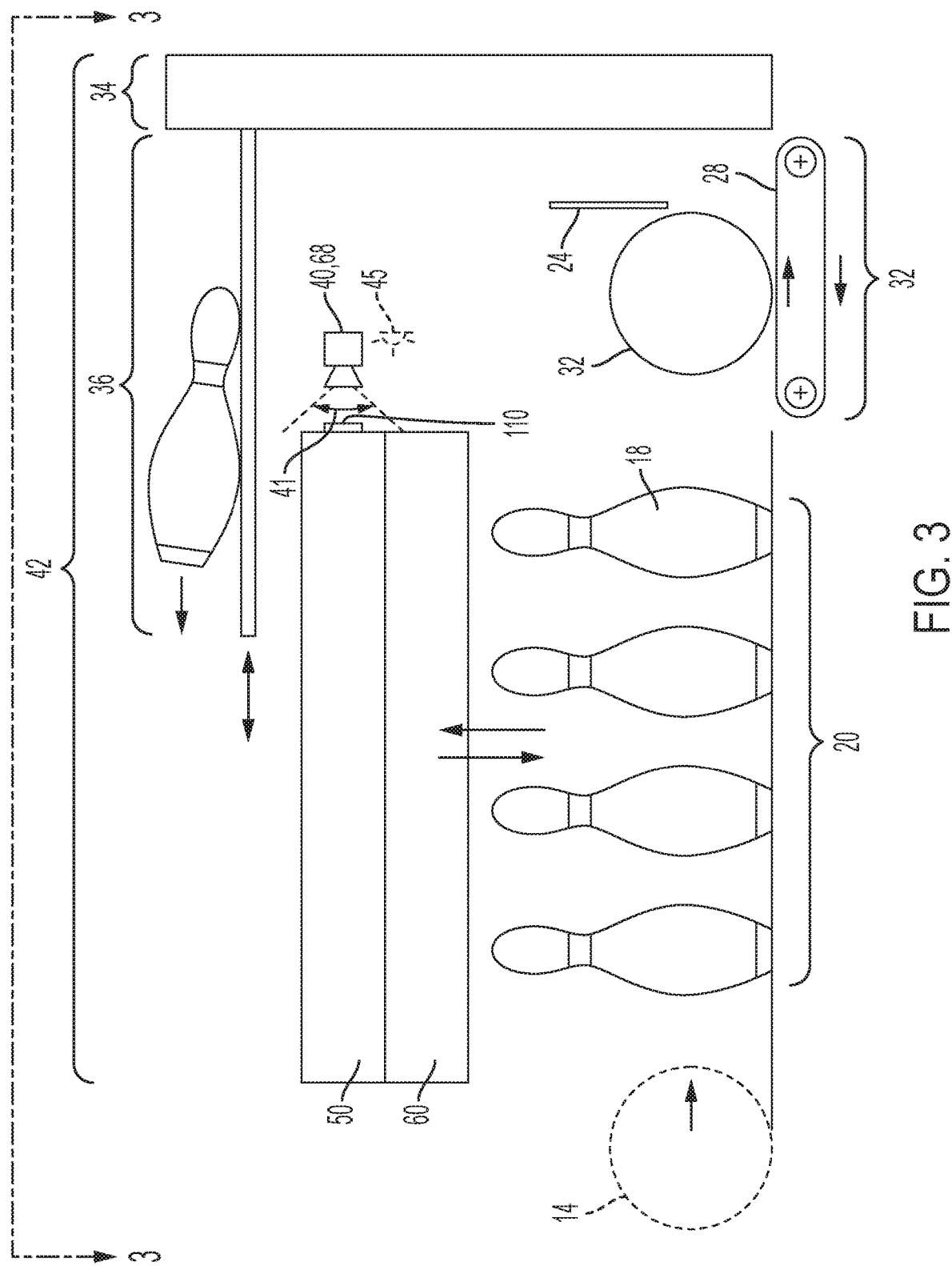
FIG. 3 is a cross-sectional view of the pinsetter shown in FIG. 1.

Additionally, as shown in FIG. 3, with respect to the pinsetter 42, a table 60 which is located under a bin and shuttle assembly 50 will receive the pins 18 and spot the pins 18 on the pin spots of the pin deck 20. The table 60 moves up and down depending on the pinsetter's cycle (i.e., first ball cycle, second ball cycle, strike cycle, first ball foul cycle, second ball fall cycle). However, as table 60 moves up and down, one or more pins 18 may not be properly seated within the cups of the bin and shuttle assembly 50. If this occurs, when the table 60 moves up so that the bowler can throw a bowling ball 14 down the lane 16, the upward moving table 60 pushes the bin and shuttle assembly 50 up and dislodges the bin and shuttle assembly 50 from its frame. This will cause a significant amount of downtime for that lane 16 since a mechanic must reseat the bin and shuttle assembly onto its frame to get the lane 16 back up and running. To prevent such a situation, another camera 40 may be placed adjacent to the bin and shuttle assembly 50 to monitor any movement of the bin and shuttle assembly 50. When the movement of the bin and shuttle assembly 50 is detected, the computer 40 which analyzes the video feed of the bin and shuttle assembly 50 may shut off a motor that drives the table 60 up. The shut down of the motor prevents the bin and shuttle assembly 50 from dislodging or unseating from the frame. Plus, the computer 40 can send a signal to a mechanic to clear the jam and restart the pinsetter 42.

Figure 6:
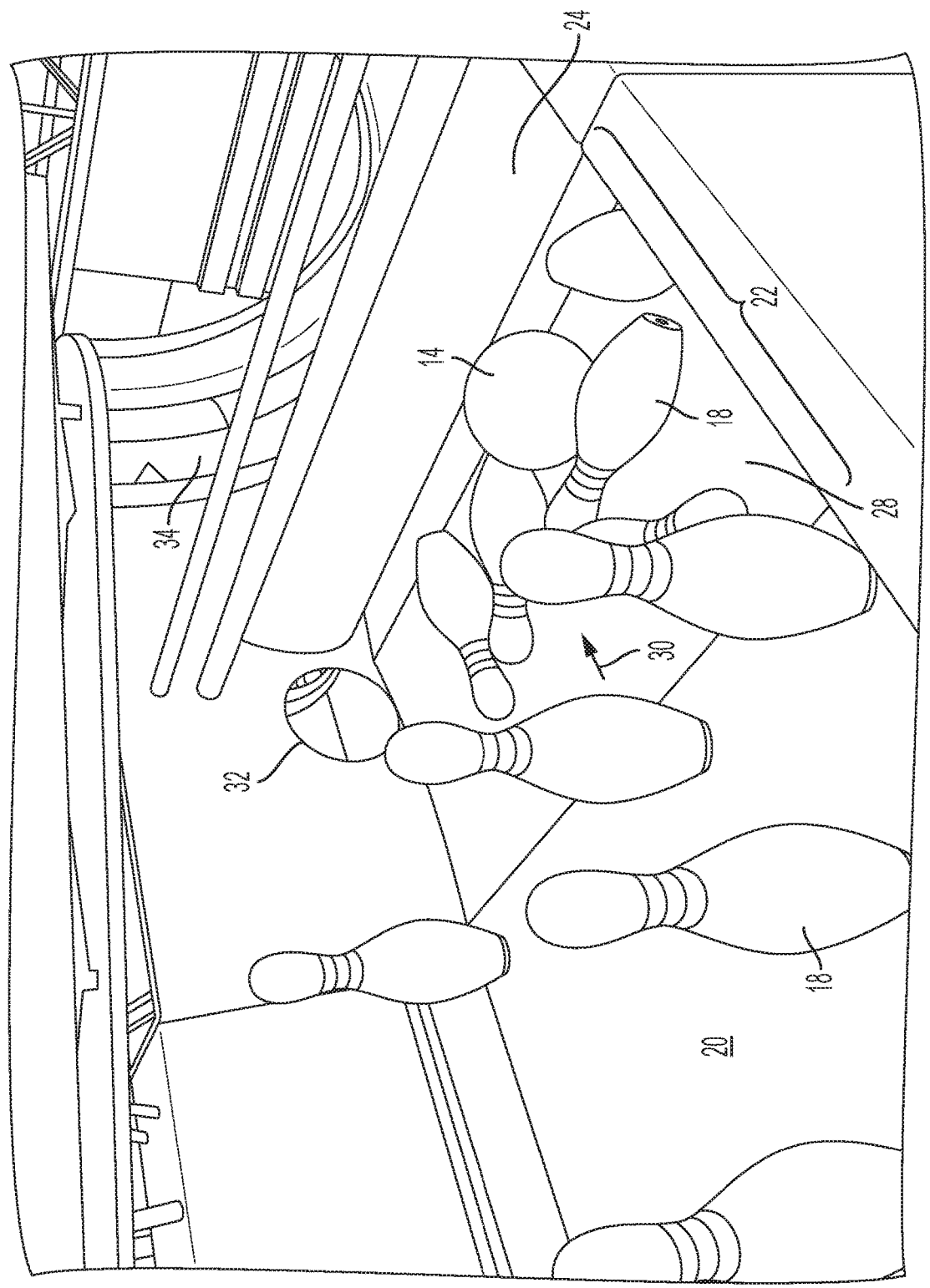
FIG. 6 is a perspective view of a pin deck and pit section of the bowling lane.
Figure 7:
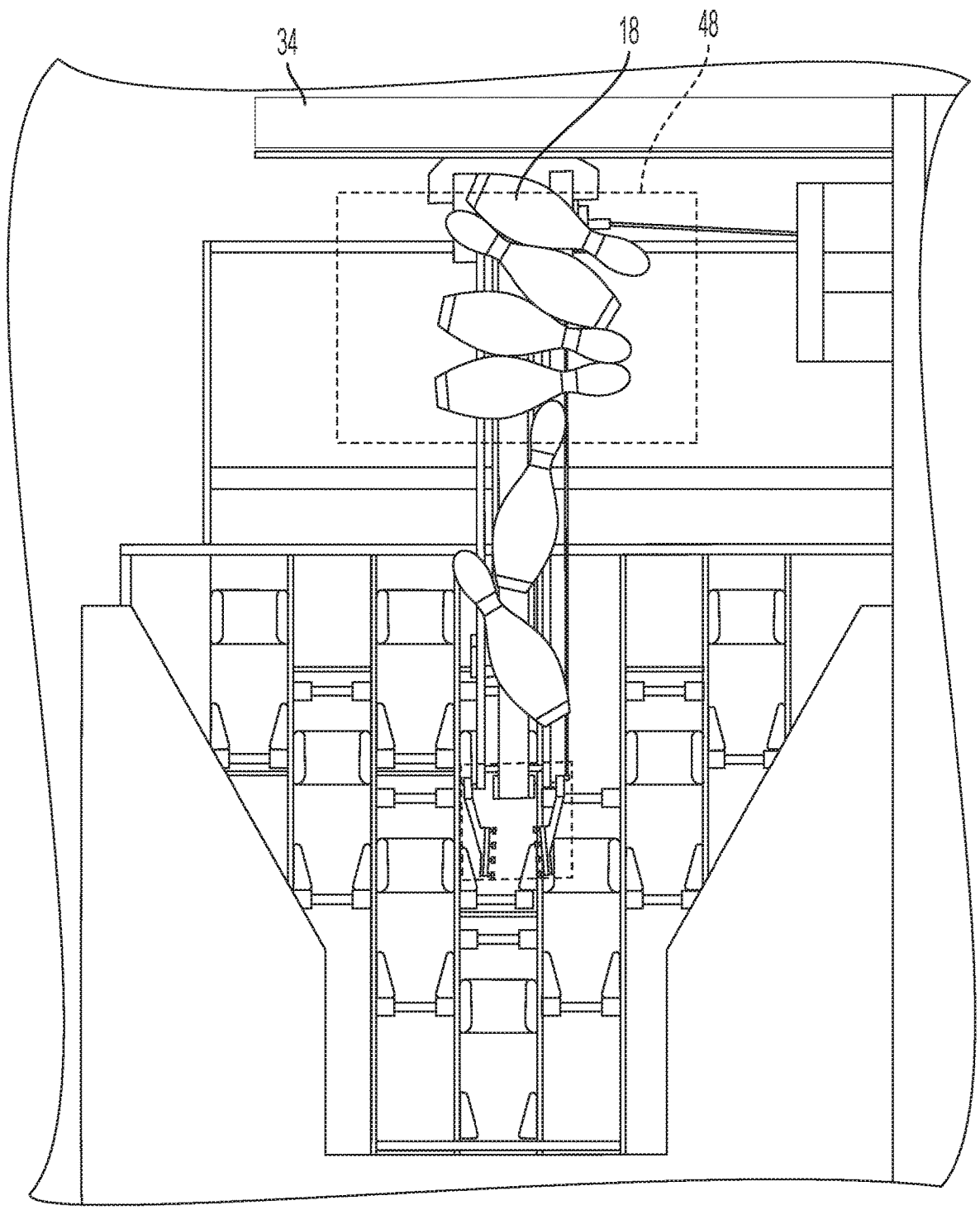
FIG. 7 is a top view of the distributor where a pin jam has occurred.

Referring now to FIG. 1, a bowler may stand in an approach section 10 of a bowling alley 12. The bowler throws a bowling ball 14 down a bowling lane 16*a, b* to hit bowling pins 18 positioned on a pin deck 20. When the bowling ball 14 hits the pins 18, some or all of the pins 18 may fall down, as shown in FIG. 6. The bowling ball 14 and the pins 18 that fall down are gathered in a pit section 22. If this is the first ball, then any fallen bowling pin 18 and the bowling ball 14 remaining on the pin deck is pushed into the pit section 22 with a sweeper arm 26 (see FIG. 26). If this is the second ball, then the sweeper arm sweeps all pins and the bowling ball 14 into the pit section 22. The pit section 22 (see FIGS. 1 and 3) is disposed immediately behind the pin deck 20. A cushion 24 (see FIGS. 3 and 6) allows the fallen pins 18 to go under the cushion 24 but not the bowling ball 14. The pit 22 has a rotating or moving carpet 28 (see FIGS. 3 and 6) that moves the pins 18 and the bowling ball 14 in the direction of arrow 30 (see FIG. 6). The cushion 24 is slanted so that the bowling ball 14 is urged through a ball return hole 32 (see FIGS. 3 and 6). Once the bowling pins 14 moves behind the cushion 24, the pins 18 are picked up by a pin elevator 34 (see FIGS. 3, 4 and 7). The pin elevator 34 brings each fallen bowling pin 18 up and places them one-by-one on a distributor 36 (see FIGS. 3 and 4). The distributor 36 may move left to right and forward and backward to drop one pin 18 in each of the 10 bins of the bin and shuttle assembly 50. Unfortunately, when the pin elevator 34 transfers the bowling pin 18 to the distributor, the pins 18 may get stuck and are bunched up as shown in FIG. 7. This situation is known as a pin jam error to a bowling alley operator.

Figure 5:
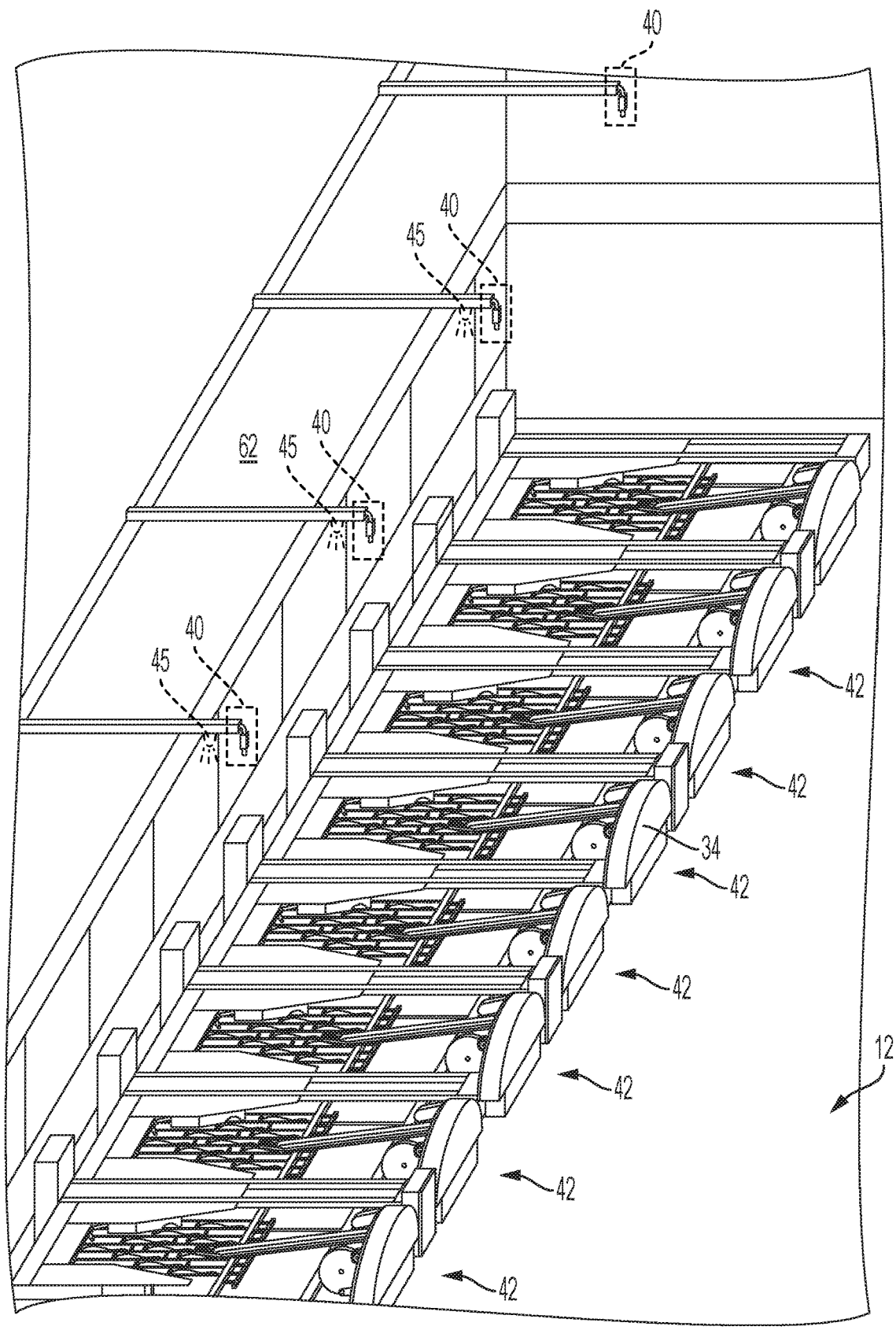
FIG. 5 illustrates a plurality of pinsetters being monitored by a plurality of cameras.

To detect a pin jam error, the bowling alley may have a video camera 40, as shown in FIG. 5. The video camera 40 may be above a pin spotter 42. One camera may monitor more than one pin spotter 42. For example, as shown in FIG. 5, four cameras 40 may monitor seven (7) pin spotters 42. In this regard, the field of view 41 of one camera may encompass two or more distributors 36 of two or more pin spotters 42. However, it is contemplated that a single camera 40 may be used to monitor one pin spotter 42.

The camera 40 may be an optical video camera and may be operative to detect light levels per each pixel within its field of view.

The camera 40 may be operative to detect visible light. In this regard, for the camera 40 and the computer 46 to properly detect the pin jam error, the lighting must be consistent. In this regard, the camera 40 may be located behind a wall 62 (see FIGS. 2 and 5) that divides the customer section of the bowling alley where customers are bowling and the operation side of the bowling alley. The operation side of the bowling alley is typically enclosed and does not have any windows that cause light levels to fluctuate up and down. In this area, artificial lighting may provide the predominant source of lighting. For this reason, the light levels within this area will remain constant regardless of the fluctuations in light in the customer section of the bowling alley that would cause significant fluctuations in light levels.

In lieu of relying on artificial white light, the camera 40 may be provided with an infrared filter so that the camera only sees light in the infrared spectrum of light. Plus, an infrared light source 45 (see FIGS. 5 and 5A) may be used and shined upon the top side of the pin spotter 42. The infrared light source 45 may be positioned so that the infrared light may be reflected off of distributor 36 being monitored. The video feed of the camera 40 may be sent to the computer 46 for processing and recognition of the pin jam error. If the camera 40 has an infrared filter, then the operation side of the bowling alley behind the wall 62 may have infrared light source 45 (see FIG. 5) that shines a light on to the tops of the bin and shuttle assemblies 50 of the pinsetters 42 being monitored. Alternatively, instead of an optical camera with an infrared filter, it is also contemplated that an infrared camera 40 may be utilized with the infrared light source 45.

Figure 4:
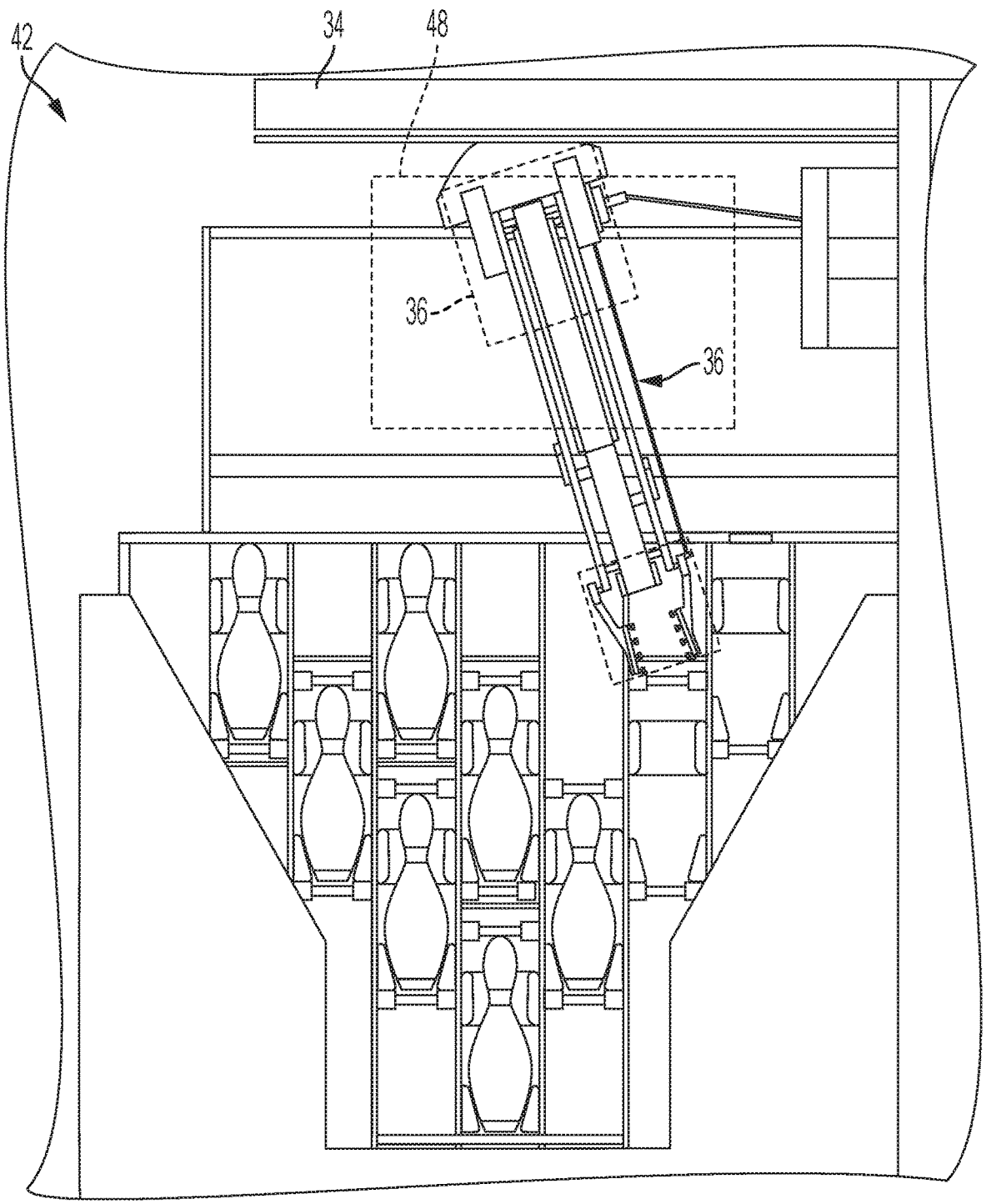
FIG. 4 is a top view of the bin and shuttle assembly and a distributor.
Figure 4A:
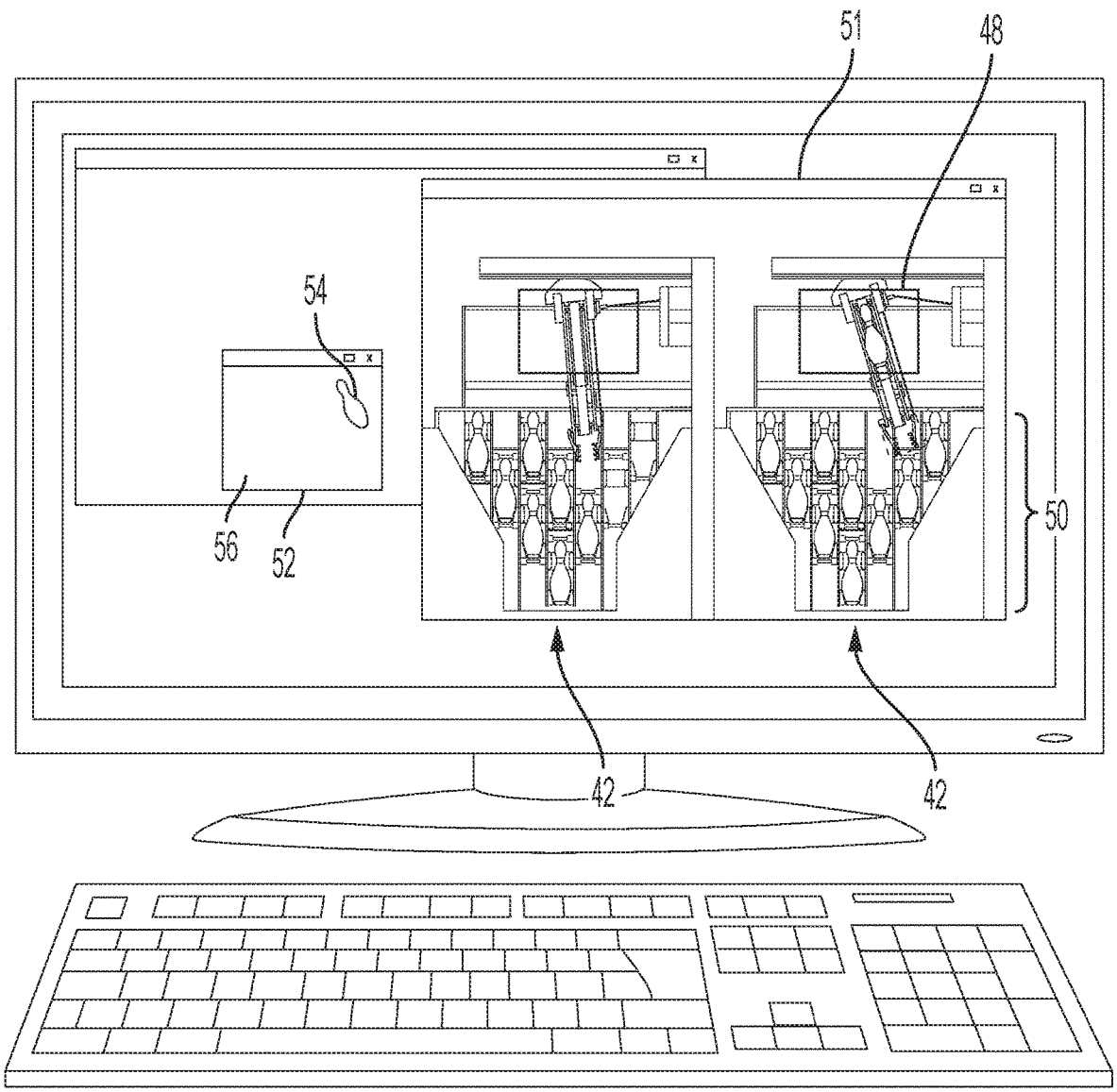
FIG. 4A illustrates a computer and monitor which shows a field of view of a camera and a window seeing the distributor.
Figure 5A:
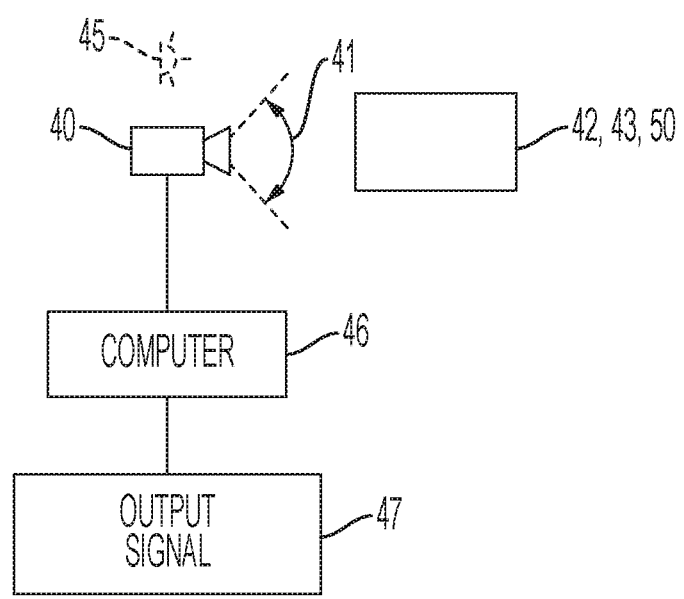
FIG. 5A is a schematic view of the error detection system.

FIG. 4 illustrates a top view of one of the pin spotters 42. FIG. 4A illustrates a computer monitor 44 which displays the video's feed of the video camera 40 showing the top view of the pin spotter 42. Once the camera 40 is in place, the camera is stationary and does not move. The camera communicates with a computer which receives the video feed from the camera 40. The computer processes the video feed on a pixel-by-pixel and frame-by-frame basis. The video's feed may be shown on a monitor 44. Since the camera 40 has a large field of view as shown in FIG. 4A, the installer of the system may draw a bounded area 48. The light levels for each pixel in the bounded area are analyzed and processed by the computer. This reduces the processing load on the computer. The computer does not need to process the light levels associated with the pixels outside of the bounded area. The bounded area 48 encompasses the distributor 36 during operation. In particular, as the distributor 36 distributes the bowling pins 18 back into the bins of the bin and shuttle assembly 50, the video camera 40 recording the images of the area within the bounded area. The light levels for the pixels in bounded area are transmitted to the computer which processes the data to determine when the pin jam error has occurred.

As discussed above, the pin elevator delivers one bowling pin 18 on the distributor 36 one at a time. The distributor 36 distributes each pin one by one into each of the bins in the bin and shuttle assembly. The computer should recognize one pin pass by or through the bounded area 48 at any one time as shown in window 52. If the computer recognizes more than one pin in the bounded area, then the computer detects a pin jam error and can send out a signal to a mechanic on the premises of the bowling alley to fix the pin jam error.

To recognize whether one or more pins are passing by or through the bounded area and the distributor 36, the computer 46, based on the pixel information within the bounded area may associate each pixel of the image in the bounded area to a first value and a second value. The first value 54 is shown in white in window 52 (see FIG. 4A). The second value 56 is shown in black in window 52. More particularly, within the bounded area 48, the computer analyzes each pixel of a frame of the video feed. If a light level of the pixel is above a threshold number, then the pixel is assigned the first value. If the light level of the pixel is less than the threshold value, then the pixel is associated with the second value. By adjusting the threshold value, the computer can detect only the bowling pin 18, as shown in window 52.

Figure 4B:
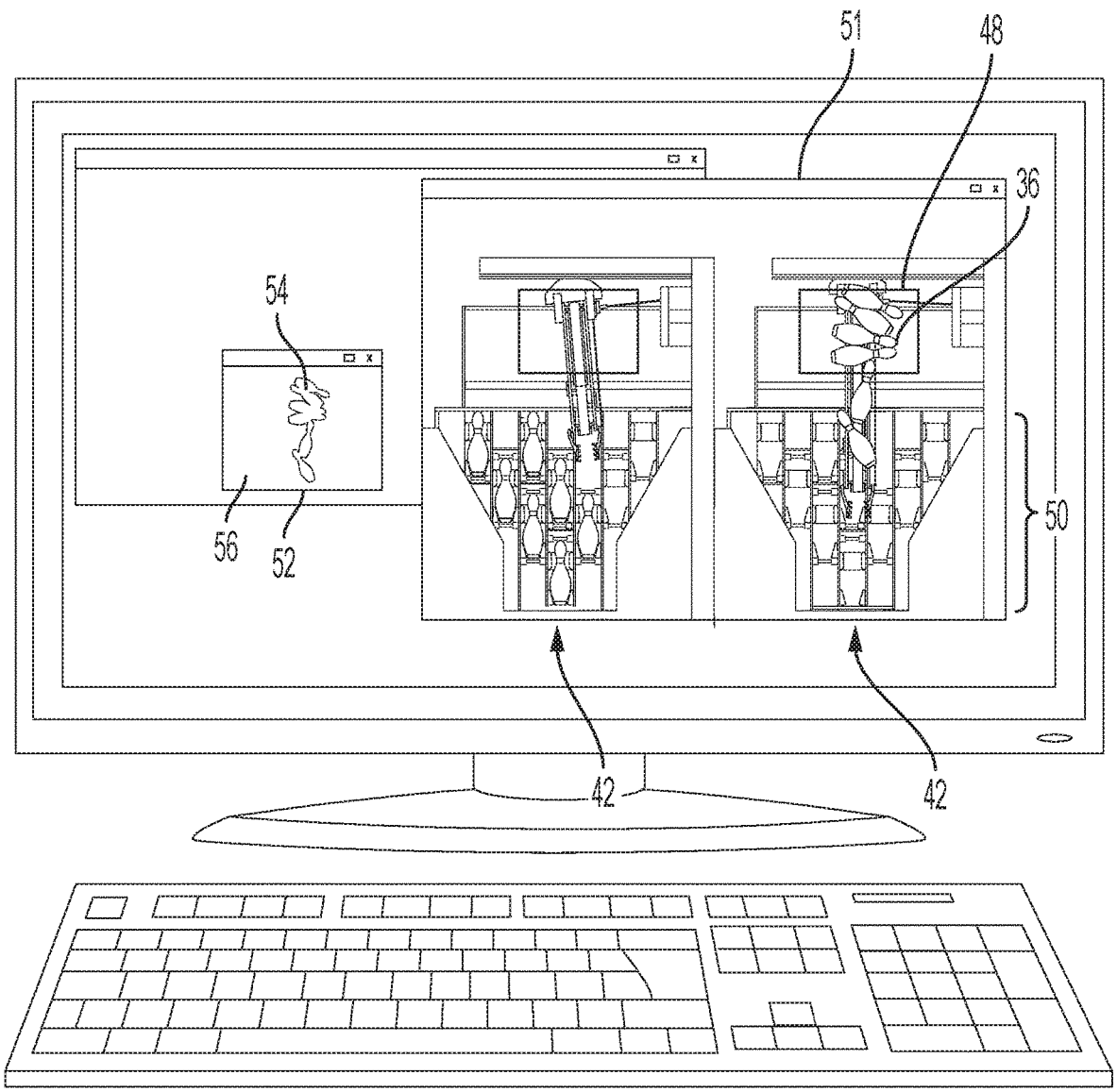
FIG. 4B illustrates a pin error jam.

Referring now to FIGS. 7 and 7A, as the bowling pin passes through the bounded area 48, the number of pixels associated with the first value goes up and down as the pins are traversed forward on the distributor 36. The computer 46 will detect a different number of pixels associated with the first value due to variations in the reflection off of the bowling pin. Based on this variation and also accounting for a safety error, a threshold number of pixels will be determined. The threshold number of pixels will be between one and two times an average number of pixels over a predetermined number of readings (e.g., 5 to 100 pin passes) associated with the first value. Preferably, the threshold number of pixels is between 1.2 to 1.8 times the average number of pixels over a predetermined number of readings (e.g., 5 to 100 pin passes) associated with the first value During operation, if the number of pixels associated with the first value is greater than the threshold number of pixels associated with the first value for a single pin, as shown in 102 in FIG. 7A, then the computer 46 will send out an output signal 47 to the maintenance crew to notify them of the error. By way of example and not limitation, the average number of pixels associated with one pin 18 may be 100 pixels. When a pin jam occurs, as shown in FIGS. 7 and 4B, the camera may view the pin jam as shown in window 51 in FIG. 4B. The pixels in the bounded area 48 may be associated with either of the first and second values as discussed above. The computer may detect the pin jam if the number of pixels associated with the first value is greater than the threshold number 100 of pixels. To increase the reliability of the error detection, the output signal 47 can be sent only if the threshold number is exceeded for more than a predetermined period of time 104 (i.e., more than five seconds).

The number of pins associable with the first value is equal to the size of a single bowling pin 18 as shown or viewed by the camera 40. The threshold number of pixels can include a safety factor. In the example above of between 1.2 to 1.8, a twenty percent safety factor was incorporated. The safety factor is to address stray light or reflections off of the bin and shuttle assembly 50 that might cause a few of the light levels not associated with the pin to be associated with the first value. If no safety factor is used, then the computer may erroneously recognize a pin jam. However, when the safety factor is applied, then the computer will ignore the stray light and reflections that might cause a false positive for a pin jam error.

When the computer recognizes the pin jam error, the computer may send a signal to warn a bowling alley maintenance person or crew to fix the pin jam. For example, in our example above, when more than 120 pixels are associated with the first value, the computer may send a signal to the mechanic to notify the mechanic of the pin jam error.

The signal may make a telephone call to a cell phone number of the maintenance crew, page the maintenance crew or send an audible signal transmitted to a headphone worn by the maintenance crew. The warning may be a visual (e.g. light), vibration (e.g. pager) or an audible signal that tells the maintenance crew that a pin jam has occurred. Moreover, the signal may also notify the maintenance crew of the exact pinsetter that has malfunctioned.

In another aspect of the method and error detection system, a ball return error can be detected and addressed before a bowler recognizes that an error has occurred. In this error, when a bowler throws a bowling ball 14 down the bowling lane 16, the bowling ball 14 is not returned to the bowler 66. The ball return error occurs when the bowling ball 14 is jammed in the pit section 22 of the pinsetter 42. Typically, this situation occurs when the ball 14 and the bowling pin 18 are jammed together. The pin prevents the bowling ball 14 from exiting the pit section 22 through the ball return hole 32. The ball 14 cannot reach the ball lift 72 (see FIG. 2). The ball lift 72 lifts the ball high enough to permit gravity to return the ball to the ball return unit via a track 70 (see FIG. 2) at the approach section 10 of the bowling lane 16. Also, the ball 14 prevents the pin 18 from passing underneath the cushion 24.

To detect such an error, a sensor 68 can be placed adjacent a track 70, as shown in FIG. 2. The track connects the ball lift 72 at the pin spotter 42 and the ball return unit 74 at the approach section 10 of the bowling lane 16. The bowling ball 14 is initially lifted up and rolled on the track 70 until it reaches the ball return unit 74. The sensor 68 senses the bowling ball 14 as it rolls along the track 70. Another sensor 76 (see FIG. 1) detects when a ball 14 is thrown on lane 16. These sensors 70, 76 may be in communication with the computer 46. The computer 46 can keep track of the number of balls thrown down the lane 16 and the number of balls that are returned to the bowler (i.e., detected on the track 70).

When the sensor 76 on the lane 16 detects that a ball 14 has been thrown down the lane 16, a signal is sent to the computer to indicate that 1 ball has been thrown down the lane 16.

The sensor 68 should detect the presence of a bowling ball 14 which indicates that the bowling ball 14 thrown down the lane 16 is now being returned back to the bowler. If the sensor 68 does not detect a bowling ball 14 within a predetermined time period (e.g., 15 seconds), then this means that the bowling ball 14 has been thrown but not returned to the bowler. The computer 46 may send an output signal 47 to the maintenance person of the bowling alley which prompts them to clear the ball return error. The predetermined time period may be 15 seconds. However, it may also be more or less than 15 seconds. By way of example and not limitation, the predetermined time period may be 5 seconds, 10 seconds, 20 seconds or up to 2 minutes in increments of 5 or 10 seconds.

Typically, one (1) track 70 (see FIG. 2) that connects the ball lift 72 to the ball return unit 74 services two (2) bowling lanes 16a, 16b (see FIG. 1). This means that bowling balls 14 thrown down bowling lanes 16a, 16b are returned to their respective bowlers on the same track 70. Track 70 is located between the two lanes 16a, 16b and hidden by capping 78 (see FIG. 1).

In this situation, each lane 16a, 16b may have their own sensor 76a, 76b. When a bowling ball 14 is thrown down either of lanes 16a, 16b, the respective sensors 76a, 76b detects that a ball has been thrown down the lane 16a, 16b. These respective sensors send this information to the computer 46. The track 70 receives and senses the balls rolled down both of the lanes 16a, b.

During operation, if a first bowler throws a bowling ball 14 down lane 16a first, then a second bowler throws a bowling ball down lane 16b two seconds later, the sensor 68 on the track 70 must detect the presence of 1 ball 14 within the predetermined time period of the first throw down lane 16a and a second ball 2 balls 14 within the predetermined time period of the second throw down lane 16b. If the sensor 68 does not sense the balls 14 within the predetermined time periods, the computer 46 will send an output signal to the maintenance crew to clear the ball return error.

More particularly, by way of example and not limitation, the first bowler may throw a bowling ball 14 down lane 16a. Sensor 76a detects the presence of a bowling ball 14a. This ball 14 is detected at time=0 seconds. The second bowler throws bowling ball 14b down lane 16b. Sensor 76b detects the bowling ball 14*b*. The computer records that this bowling ball 14*b* was detected at time 2=seconds. The bowling balls 14*a*, 14*b* are lifted up by the ball lift 72 which services both pin spotters 42*a*, 42*b*.

The bowling balls are then sent back to the bowler and to the ball return unit 74 via track 70. Either the first or second ball 14*a, b* may be sensed by sensor 68 at time 10 seconds. This ball detection will be attributed to the first ball 14*a* sensed by sensor 76*a*. If the second ball (i.e., either ball 14*a, b*) is detected by the sensor 68 at time=11 seconds. The second ball 14*b* will be attributed to the second throw. If the first ball 14*a* was jammed in the first pinsetter 42*a*, then the second ball 14*b* will have been attributed to the first throw.

However, since the first ball 14*a* is still stuck or jammed in the first pinsetter 42*a*, the system will detect that one (1) ball is stopped because the second throw has not been accounted for. If more than the predetermined time period elapses, then the computer will send a signal to the maintenance crew to correct the error.

The sensor 68 may be a camera 40. In this regard, a light source (i.e., white light or infrared light) can be directed toward the track 70 to detect the bowling ball that will roll on the track 70. If white light is used, then the camera may be an optical video camera. If infrared light is used, then the optical video camera may have an infrared filter so that the camera records the infrared light reflected off of the bowling ball 14. Alternatively, the camera may be an infrared camera. The video camera will record the reflection off of the bowling ball. The camera will send a video feed to the computer 46. The computer can analyze the light intensity levels on a pixel-by-pixel basis of a bounded area. The bounded area is within the field of view 41 of the camera where the bowling ball 14 is passed by.

Whenever the number of pixels detecting a light intensity or reflection level is greater than a threshold number, then the computer may recognize the presence of a bowling ball 14. By way of example and not limitation, referring to FIG. 2A, as each ball 14 passes through the bounded area of the field of view 41 of the camera, the video feed of the camera is sent to the computer to process the light levels of the pixels within the bounded area. As the ball 14 enters the bounded area, the number of pixels associated with the first value increases. When the entire ball is within the bounded area, the number of pixels associated with the first value remains constant. This is the maximum number of pixels that can be associated with the first value. However, variations in the ball color will cause the maximum number of pixels that can be associated with the first value to fluctuate. As the ball 14 leaves the bounded area, the number of pixels associated with the first value decreases. When the number of pixels associated with the first value is greater than the threshold number 100, then the computer will recognize that a ball is being returned to the bowler. The threshold number 100 can be equal to an average number of pixels over a predetermined number of readings (e.g., 5 to 10 ball passes). Preferably, the threshold number 100 is 99% to 70% of the average number of pixels over a predetermined number of readings (e.g., 5 to 10 ball passes).

In an alternative way to detect a ball return error, the camera 40 may be a video camera and capable of recording color (i.e., color video camera). As the ball passes by the camera 40, the camera sends the video feed to the computer. The computer analyzes the video feed and determines that a bowling ball has passed by the camera 40 and thus a bowling ball has been thrown down the bowling lane. Moreover, the computer may analyze the video feed to determine the color of the bowling ball. The sensor 68 may be a color video camera. In this case, white light is shined within the field of view of the sensor (i.e., color video camera) 68 on the track. The color video camera 68, 40 sends its video feed to the computer. The computer detects when the ball is being returned to the bowler. Moreover, computer also analyzes the video feed to detect the color of the ball. The computer must detect the same color detected by the camera 40 on top of the lane with the video feed from the color video camera on the track of the ball return system within a predetermined period of time (e.g., 5 seconds, 10 seconds, 15 seconds). Otherwise, a ball return error is detected and an output may be emitted to alert the bowling alley maintenance personnel. Alternatively or additionally, a sensor 68 (e.g., optical color video camera) may be placed near the ball return hole 32 before the ball travels on any portion of the ball return system which is shared with the adjacent bowling lane.

In another aspect of the method and apparatus of detecting errors of a bowling alley, a sensor can also be placed adjacent to the ball return unit 74, as shown in FIG. 10. The sensor 68 may be a proximity sensor. As shown in FIG. 10, the sensor 68 may be video camera, video camera with an infrared filter, or an infrared camera. A light source 45 may be placed adjacent to the ball return unit 74 as well.

The camera 40 can be pointed in a direction transverse to ball travel 80. A bounded area 48 may be drawn in the area of travel of the ball 14. As can be seen in FIG. 10, the ball 14 travels in the direction of arrow 80. When a bowling ball 14 enters the bounded area 48, light is reflected off of the bowling ball 14. Light reflected off of the bowling ball 14 is captured by the camera 40 on a pixel-by-pixel and frame-by-frame level. The video feed is sent to the computer which analyzes the light levels pixel-by-pixel on a frame-by-frame basis. When the number of pixels indicates that a bowling ball 14 has been detected, the number of pixels must drop back to 0 or some other base-level number which indicates that the bowling ball has cleared the ball return unit 74. Otherwise, the computer will send the output signal 47 to the maintenance crew.

Referring now to FIG. 10A, when the bowling ball 14 enters the bounded area, the number of pixels associated with the first value increases. When the entire bowling ball 14 is in the bounded area, the number of pixels associated with the first value remains constant. It will remain constant for a certain period of time. The computer can calculate the average time period 108 for a certain number (e.g., 10 ball passes). When the bowling ball 14 leaves the bounded area, then the number of pixels associated with the first value will decrease. When the belt 75 of the ball return unit 74 does not lift the ball up and onto the rack of the ball return unit, the ball will remain within the bounded area (i.e., line of travel on the belt 75) for an extended period of time 106 (see FIG. 10A). When the time 106 is greater than the average time period 108 or significantly greater than the average time period 108, the computer 46 may recognize an error in the ball return unit 74.

Referring now to FIGS. 3 and 3A, a sensor 68 can be placed adjacent to the bin and shuttle assembly 50 to monitor whether there is any movement of the bin and shuttle assembly 50 as the table 60 traverses up and down to spot the pins 18 on the pin deck and lift the pins 18 off of the pin deck during operation of the bowling lane 16. The bin and shuttle assembly 50 should not move during normal operation. However, sometimes, the pins 18 in table 60 will get jammed or misplaced. When this happens, the misplaced pin 18 in table 60 will push against the bin and shuttle assembly 50 when table 60 is traversed upward. The manufacturer has designed the bin and shuttle assembly 50 to move upward to prevent the pinsetter 42 from breaking or becoming damaged. However, when this error occurs, the bin and shuttle assembly 50 is dislodged. Maintenance personnel needs to reseat the bin and shuttle assembly 50 and clear the misplaced pin 18. This takes time and causes dissatisfaction with the game of bowling due to the delays. Fortunately, the sensor 68 can detect movement of the bin and shuttle assembly 50 so that when the bin and shuttle assembly 50 moves upward, the motor which traverses the table 60 upward is stopped and the maintenance crew is notified to fix the error. In this way, the bin and shuttle assembly is not dislodged. Rather, maintenance personnel only needs to clear the pin 18 between the bin and shuttle assembly 50 and table 50.

The sensor 68 may be 1) an optical video camera, 2) an optical video camera with an infrared filter and infrared light source or 3) an infrared camera with an infrared light source. The sensor can detect movement of the bin and shuttle assembly 50 if any of the pixels associated with a bounded area has a significant change in light levels. By way of example and not limitation, the field of view of the camera 40 can be directed toward the bin and shuttle assembly 50. A bounded area can be drawn so that only the pixels associated with the bin and shuttle assembly 50 are analyzed by the computer 46. The video camera 40 will take a snapshot of the bounded area and determine whether each pixel is associated with a first value or a second value. This is a map of the first and second values of the pixels in the bounded area. When the bin and shuttle assembly moves, the values of the pixels in the bounded area will change. When there is a change (i.e., 1% to 30% of the pixels), then the computer will send an output signal which may be a notice to the maintenance crew to fix the error. Alternatively, a white sticker 110 can be attached to the bin and shuttle assembly 50. The bounded area can be slightly larger than the size of the sticker so that the bounded area sees the entire sticker and when the computer determines that movement of the sticker has occurred, then the output signal will be sent to the maintenance person and stop the motor which drives the table 60 upward.

Referring now to FIG. 3A, the camera detects no change or a change in first and second values associated with the pixels in the bounded area below a threshold number. The threshold number is greater than zero to account for slight changes in the lighting when someone walks by or other fluctuations in lighting. As soon as the number in pixels changing values is greater than the threshold number 112, the computer 46 can send an output signal which turns off the motor driving the table 60 and sends a notification to the maintenance crew to fix the error.

Through the early warning notice of the various aspects described herein, interruptions to the bowling game are minimized or not perceived by the bowler.

Figure 8:
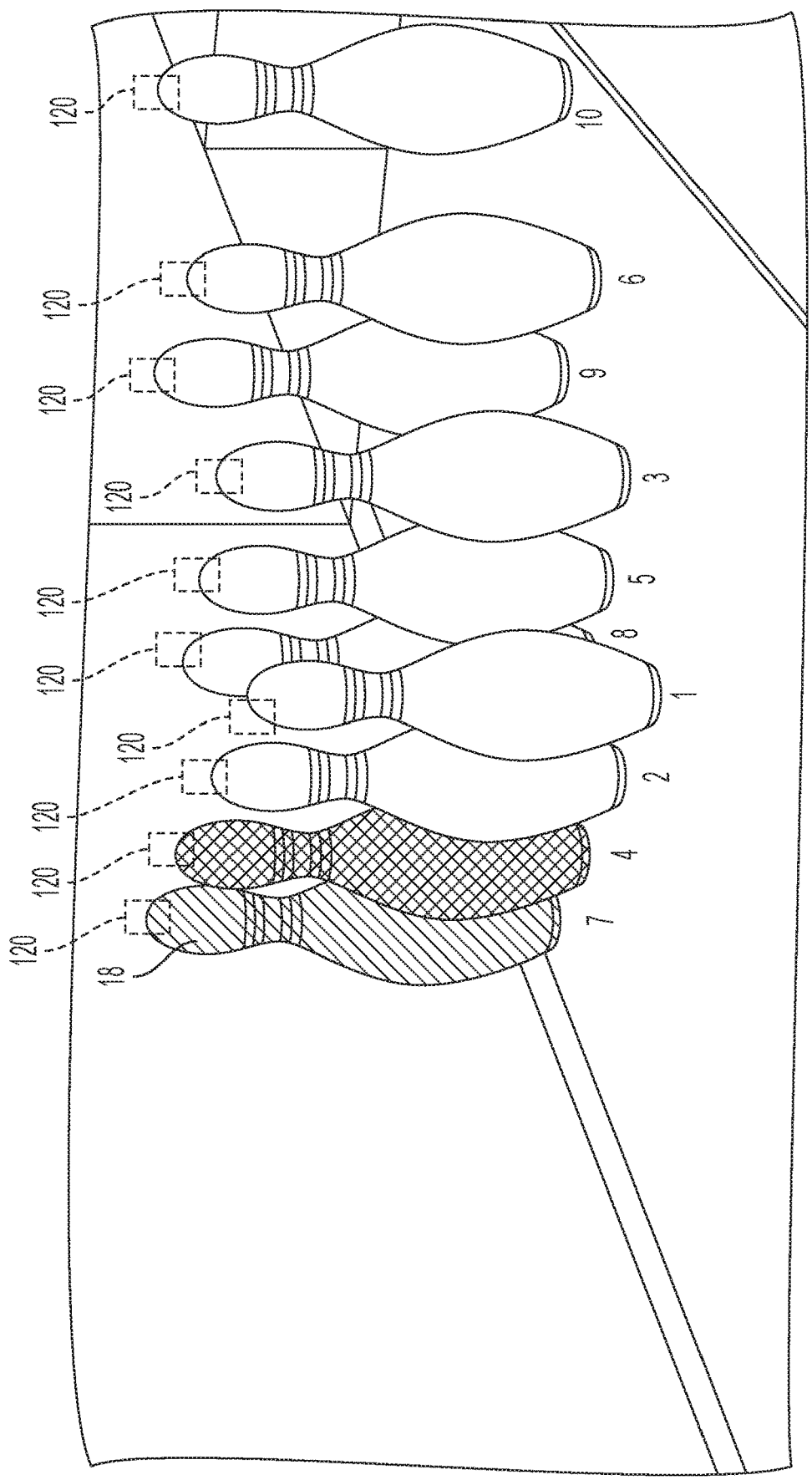
FIG. 8 illustrates a camera detecting colors of the bowling pins.
Figure 9:
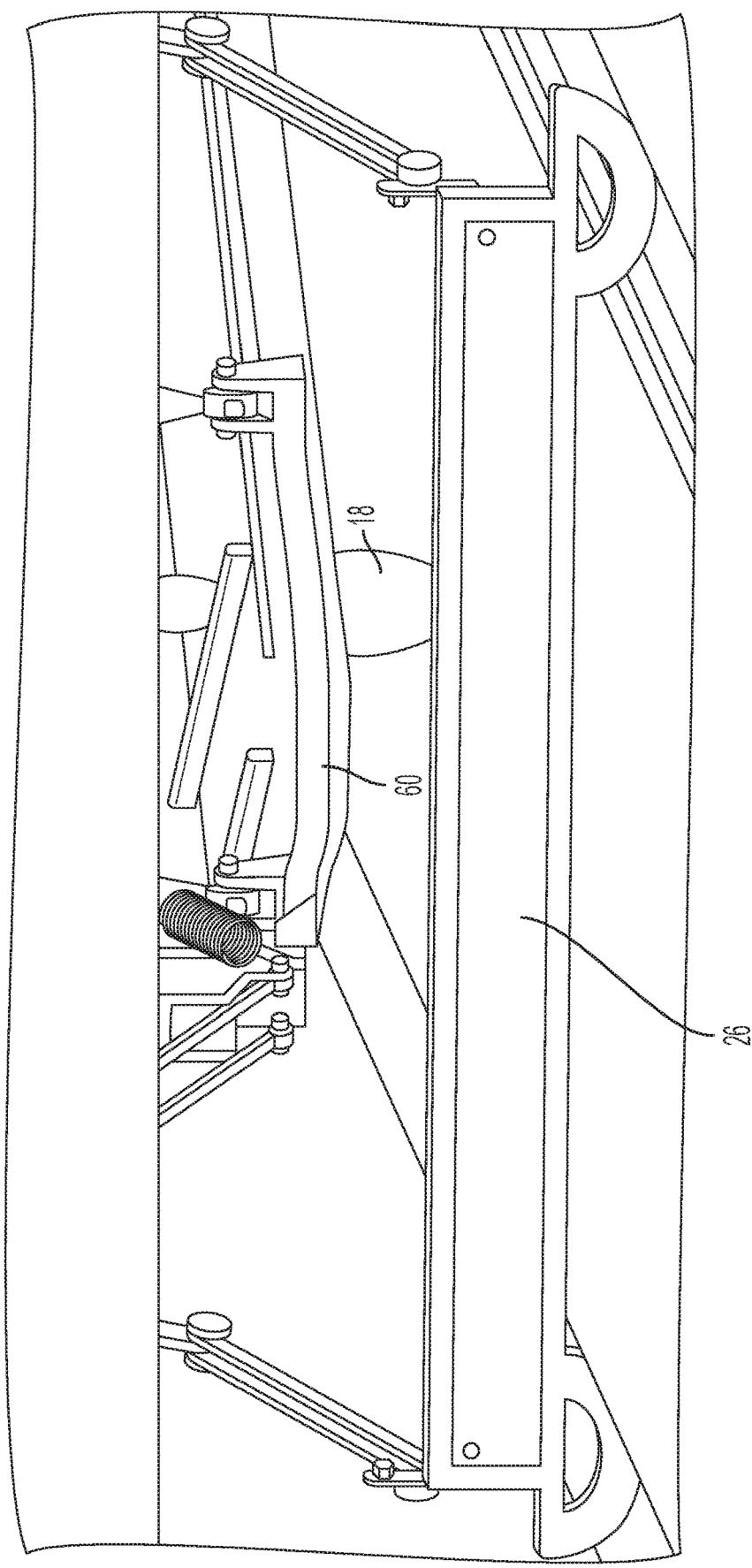
FIG. 9 illustrates a table that sets the pins on a pin spot on a pin deck of the bowling lane and a sweeper arm.

Referring now to FIGS. 1 and 8, the bowling lane 16 may be fitted with an optical camera 120 which can record color. The optical camera 120 may have within its field of view 41 (see FIG. 5A) all of the bowling pins 18 associated with its bowling lane, as shown in FIG. 8. In FIG. 8, hatch marks have been identified on two (2) of the ten (10) bowling pins. These hatch marks merely illustrates that the bowling pins 18 are of different colors. Moreover, although only two (2) of the ten (10) bowling pins have hatch marks, all of the bowling pins may be differently colored (e.g., red (R), green (G), white (W), black (B), etc.). Moreover, different combinations of colors are also contemplated. The camera 120 may view the bowling pins and send the video feed to the computer. The computer may identify the colors of the bowling pins and their locations during the first frame. Once the bowler bowls the first ball, if some of the bowling pins 18 have been struck down, then the camera may detect which ones were struck down and their respective colors. The bowler is then given a 2nd ball to throw down the bowling lane. When more bowling pins 18 are struck down, the computer may recognize the number of bowling pins being struck down and their respective colors. Through this, the computer may score the game based on the number of pins struck down but also the color of the pins being struck down.

The camera 120 may be a camera that is capable of detecting color. The video feed of the camera including information about color may be sent to the computer 46 which analyzes the data of the camera feed to determine which pins were knocked down and the color of those pins. To do so, a bounded area is defined at the location of each of the bowling pins 18. For example, in FIG. 8, the bounded areas are associated with the heads of each of the bowling pins. The bounded areas 120 do not overlap any two (2) pins. Rather, they are only associated with a single pin. The bounded areas 120 may cover, an outer periphery or shape of the bowling pin. However, it is also contemplated that the bounded area may encompass the pin 18 only. Before the first ball is thrown, the computer may recognize all of the colors of each of the pins and their locations based on the color, light levels in the bounded areas 120. When the first ball is thrown, the computer will determine if any of the pins have been struck down. If so, the computer will not see such color in the bounded area. This represents that the pin has been struck down. The computer 46 will record such information and send the information to the scoreboard. Moreover, when the bowler throw the second ball, the computer will recognize if any of the other previously standing pins have been struck down. If so, the computer will send information to the scoreboard in order to calculate the players bowling score.

Referring now to FIGS. 1, 5, 8 and 11-13, the camera 120 which is used to detect the pins on the pin deck and the camera 40 which is used to detect the pins passing on the distributor may be color video cameras. The video feed of the color cameras 120, 40 may be sent to a computer to analyze the data. In particular, video feed of the color camera 120 will be used to detect whether a pin is standing or fallen and the colors of the pins that have fallen and the ones that are standing.

Before a ball is thrown, camera 120 may send its color video feed to a computer. Camera 120 is in front of the pins on the pin deck and is used to determine which pins are standing and which ones have fallen. The computer uses the video feed of camera 120 to detect the color of the pin at the various pin positions before the first ball for the first frame is thrown. For example, as shown in FIG. 11, the upper row of the table is the pin position by number. The lower row of the table is the color associated with each pin position. This represents that all pins are standing before the bowler has thrown a ball. This is the case before the first ball is thrown during the first frame. After the bowler throws a ball down the lane, for example, the bowler may cause pins 9, 6 and 10 to fall down. The table 60 picks up the pins that are still standing on the pin deck. The sweeper arm sweeps off the fallen pins. The table 60 drops the pins back down and sets the pins back on the pin deck. The camera 120 at this points takes a video of the pins before the second ball is thrown down the lane by the bowler. The camera 120 sends the video feed of the pins after the table 60 has picked up the remaining standing pins and placed them back on top of the pin deck. The first ball of the first frame caused two White (W) pins and one Red (R) pin to fall down. This is represented by Xs in FIG. 12. As shown in FIG. 12, all other pins are associated with a color except for pins 9, 6 and 10. The computer compares tables in FIGS. 11 and 12 and determines that pins 9, 6 and 10 have fallen. The computer then takes the colors associated with these pin locations recorded in the table of FIG. 11. These are two red pins and one white pin.

Two Red pins and one White pin should be lifted up in the pin spotter and set in bins of the bin and shuttle assembly via the distributor. The camera 40 over the distributor detects the pins that are being placed in the bin and shuttle assembly. The camera 40 sends its video feed to the computer. The computer detects when pins are passing on the distributor and analyzes the video feed data to detect the colors of the pins. The computer analyses the colors of the pins passing on the distributor. The computer should determine that two Red pins and one White pins are passing on the distributor. Otherwise, an error is detected. The above sequence may occur for the first frame.

At one level, the computer should determine that three pins are passing on the distributor within a predetermined period of time (e.g., 10 seconds for 1 pin and 30 seconds for 10 pins) after the video feed of the camera 120 detects that three pins were knocked down. This is accomplished because the number of pixels associated with one pin as described herein is greater than a first threshold number but below a second threshold number as one pin is passed on the distributor. When the pin is passed off of the distributor, the number of pixels decreases. If the number of pixels associated with a pin increases above the second threshold, then a pin jam error is detected. As the number of pixels associated with a pin increases above the first threshold and drops below that threshold but never rises above the second threshold, the computer will count one pin. The computer should count three pins or the number of pins that were knocked down and as counted based on the video feed of camera 120. Otherwise, an error is detected, and an error output signal is generated by the computer. Alternatively, or additionally, as a further refinement, the computer determines the colors of the three pins or the pins that pass over the distributor, the colors of the pins should match the colors of the pins that were knocked down based on the video feed of the camera 120. As such, the error is detected if the number of pins based on the video feed of the camera 40 does not match the number of pins based on the video feed of the camera 120. Otherwise, an error is detected, and an error output signal is generated by the computer.

Moreover, based on the number of pins in the pin spotter, the order of the pins and their colors can be detected. In the example, above, if 20 pins total are in the pin spotter, then the two red pins and one white pin are dropped into pin positions 1, 2 and 3 in the order that they were detected by the camera 40 and computer. If the pins are distributed via the distributor in the order of white, white, red, then pin position 1 should be white, pin position 2 should be white and pin position 3 should be red. This is reflected in table shown in FIG. 14. When the pins in the upper table are eventually set on the pin deck for bowling the first frame, the camera 120 sends the video feed to the computer. The computer should detect the correct color pins in pin positions 1, 2 and 3. In the example above, the pin position 1 should be white, pin position 2 should be white and pin position 3 should be red. Otherwise an error has occurred and an output signal will be sent.

When the lane is ready for the second ball, the bowler may throw the bowling ball down the lane. The ball may strike down pins 4, 7 and 8. The camera 120 may send the video feed of the pins before the sweeper arm takes down all of the remaining standing pin. The computer detects which pins are not present. The pins that are not present are pins 7, 4, 8, 9, 6, 10. The computer compares the table of FIG. 13 with the table of FIG. 12. The computer determines that the only change between the tables of FIGS. 12 and 13 are from pins 7, 4, 8. These are the pins that fell due to the second ball during the second frame. The 7 pin is Blue (B). The 4 pin is Green (G). The 8 pin is Blue (B). The computer identifies that these colored pins have fallen. Two blue pins and one green pin are identified by the computer. These pins are raised by the pin spotter to the distributor. The camera 40 over the distributor is taking a video feed of the distributor. The video feed from the camera 40 is sent to the computer. The computer detects the colors of the pins passing on the distributor. The computer should detect two blue pins and one green pin passing over the distributor. If the computer does not detect two Blue pins and one Green, then an error has occurred and the computer will send an output signal.

Moreover, the table shown in FIG. 14 will be filled up in the order that the pins and their associated colors pass by the distributor. Based on the type of pin spotter, the pin spotter fills the bins of the upper table in the same order. In the example above, pin positions 4, 7, 8 will be filled with two blue pins and one green pin in the order that they were detected by the camera 40 and the computer based on the camera's video feed. If the pins passed over distributor in the order of two blue pins and one green pin, then the computer will fill in the table of FIG. 14 as shown in the table of FIG. 15. When the sweeper arm knocks down the rest of the pins, the rest of the pins are distributed on the upper table via the distributor. The camera over the distributor sends its video feed to the computer and determines the order of the colors and fills in the rest of the table shown in FIG. 15. For example, if the pins pass over the distributor in the follow color order green, green, white, white, then pin position 5 will be white, pin position 6 will be white, pin position 10 will be green and pin position 9 will be green as shown in the table shown in FIG. 15.

The pins in the lower table are then set on the pin deck and the bowlers plays his or her turn. The pins in the upper table are then disposed in the lower table. After the bowler plays his or her turn, the pins in the lower table are placed on the pin deck. The camera 120 takes a video feed of the pins on the pin deck and sends this video feed to the computer as described above. The computer generates the type of table shown in FIG. 11 which is based on the video feed from the camera 120. The colors and the pin positions should match the colors and pin positions shown in the table of FIG. 15. If the colors and pin positions match, then no error and no output signal is sent. If the colors and pin positions do not match, then an error occurs and an output signal identifying the error is outputted.

The purpose of detecting the colors of the fallen pins and determining whether those fallen pins are being put back into the system is for the purposes of scoring a bowling game based on the colors of the pins that are struck down. If pins are being swapped at the pin spotter for different colored pins, then the scoring could be off because the number of any specific color of pins is not the same between different bowlers. As such, the aspect of the bowling alley operation described in relation to FIGS. 1, 5, 8 and 11-13 are for the purpose of detecting whether pin colors are being switch out without the knowledge of the bowlers during a game where the score of the game is based on the colors of the pins being knocked down.

Moreover, the various aspects described in relation to FIGS. 1, 5, 8 and 11-13 was described in relation to a pin spotter that fills the bin assembly in the order of pin positions 1, 3, 2, 4, 7, 8, 5, 6, 10, 9. However, the various aspects described in relation to FIGS. 1, 5, 8 and 11-13 may also be implemented on a turret based pin spotter. In particular, instead of the distributor filling pin positions as described above, the turret based pin spotter fills the pin position in the order of pin positions The distributor distributes the pins to the turret based pin spotter in a specific order. As such, the table will be filled in the order of pin positions 1, 2, 3, 4, 10, 5, 6, 7, 8 and 9. Other pin spotters having different order drops are also contemplated and the various aspects described in relation to FIGS. 1, 5, 8 and 11-13 may be implemented on these other pin spotters may be adjusting the pin positions in the tables associated with FIGS. 11-15.

When the color of the pins are being tracked with the optical color video camera, the pins may be counted as described in relation to FIG. 8 herein. Moreover, as an additional error detection, the computer may send an output signal identifying an error if the system does not detect that the colored pins that were knocked down after the first ball is thrown and after the second ball is thrown are not detected on the distributor within a predetermined period of time. For example, the camera 120 in front of the pins on the pin deck may send its video feed to the computer. The camera 40 above the distributor may also send its video to the computer. The video feeds may be time stamped to each other. In this way, when the computer detects that pins having certain colors have fallen on the pin deck after a ball is thrown the computer must detect those color pins on the distributor within such period of time. Otherwise, the computer may send an output signal identifying an error. As a further refinement, the predetermined period of time may be adjusted to the number of pins that were struck down. For example, if one pin was struck down, then the predetermined period of time is shorter than the situation where 2 pins were struck down. The predetermined period of time may be between 5 seconds to 30 seconds.

Figure 16:
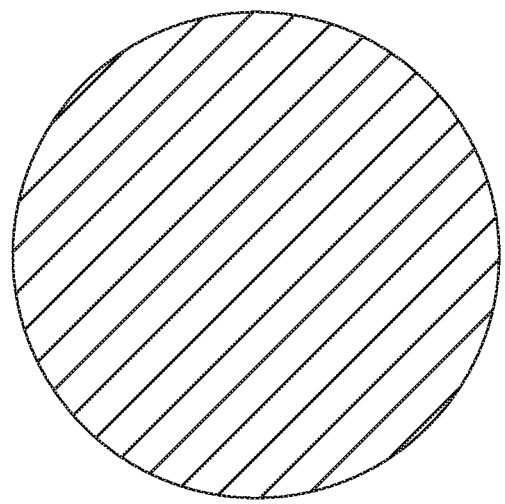
FIG. 16 illustrates a bowling ball identified by a computer based on a video feed of a camera positioned in front of the pin deck at first time.
Figure 17:
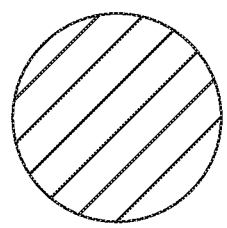
FIG. 17 illustrates the same bowling ball identified by the computer based on the video feed of the camera positioned in front of the pin deck as a second subsequent time.

Referring now to FIGS. 16 and 17, the camera 120 may be utilized to calculate a speed on the bowling ball being thrown by the bowler. In particular, the video camera takes a series of images of the bowling ball as it approaches the bowling pins. As the bowling ball approaches the bowling pins, the bowling ball is recorded by the camera as being smaller and smaller because the camera records the bowling ball in a diminishing perspective view. The video feed of the camera may be analyzed by the computer in the following manner. First, the computer detects the bowling ball and calculates a number associated with the size of the bowling ball on the image at time=0. The number associated with the size of the bowling ball may be a size such as diameter, circumference, surface area. By way of example and not limitation, the number associated with the size of the bowling ball may be a number of pixels that the bowling ball takes up in the image which is related to the surface area. The number could be the number of pixels across the bowling ball (i.e., diameter) or the number of pixels about its periphery (i.e., circumference). Next, the computer can detect the bowling ball at time=1 and calculates the same number associated with the bowling ball. For example, if the total number of pixels (i.e., surface area) associated with the bowling ball is calculated, then the computer can then calculate the speed of the bowling ball. In particular, the computer calculates the time difference between time=0 and time=1. Moreover, the computer calculates the difference in the number of pixels of the bowling ball in the video feed at time=0 and time=1. The computer generates a rate of reduction of the number of pixels over a period of time. This rate can be associated with a speed of the ball. The higher the rate of reduction of the number of pixels over a period of time, the greater the speed of the ball. The lower the rate of reduction of the number of pixels over a period of time, the lower the speed of the ball. The process described in relation to FIGS. 16 and 17 may be utilized instead of using two cameras on the lane which are used to calculate speed of the bowling ball down the lane.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system of detecting an error in an operation of a bowling lane, the system comprising:
   the bowling lane including:
      a pin setter having a distributor;
      a pin deck disposed adjacent to the pin setter; and
      a plurality of pins, some of the pins being disposed on the pin deck, and some of the pins handled by the pin setter to position the pins on the pin deck;
   a first camera disposed adjacent to the bowling lane, a field of view of the first camera encompassing pins on the pin deck;
   a second camera disposed above a distributor of a pinsetter, a field of view of the second camera encompassing the pins on the distributor from above the pinsetter; and
   a computer in communication with the first camera and the second camera to receive a first video feed from the first camera and to receive a second video feed from the second camera, wherein:
   the first video feed is time stamped;
   the second video feed is time stamped, and the first and second video feeds having synchronized time stamps;
   the first video feed is analyzed to determine a number and color of pins that were knocked down and a number of balls found in the field of view of the first camera;
   the second video feed is analyzed to determine a number and color of pins were knocked down and a number of balls found in the field of view of the second camera; and
   for the number of pins and balls based on the analyzed first video feed not equating to the number of pins and balls based on the analyzed second video feed, send an error output signal.

2. The system of claim 1, wherein:
   the error output signal is sent if the number and colors of the knocked down pins analyzed in the first video feed is not equal to the number and colors of the knocked down pins analyzed in the second video feed.

3. The system of claim 1, wherein the error output signal is sent if a correct number of pins knocked down is not detected within a predetermined period of time after the number of pins were knocked down.

4. The system of claim 2, wherein the error output signal is sent if a correct number and color of pins knocked down is not detected within a predetermined period of time after the number and colors of pins were knocked down.

5. The system of claim 4, wherein the error output signal is sent based on the number of pins determined as being knocked down; and wherein the error output signal is sent if for the number of balls based as analyzed in the first video feed does not equate to the number of balls as analyzed in the second video feed.

6. The system of claim 5, wherein the predetermined period of time is based on the number of pins detected as being knocked down, the predetermined period of time is set for a longer period of time as the number of pins detected as being knocked down increases.

7. The system of claim 2 wherein the distributor fills first through tenth bins of the pin setter with the plurality of pins in a particular order, based on the second video feed of the second video camera, the colors of the pins at specific pin locations are known, and wherein the colors of the pins at specific pin locations based on the first video feed are compared to the known pin colors based on the second video feed, and an output error signal is sent if the colors of the pins based on the first video feed does not match the known pin colors.

8. The system of claim 1, wherein the first camera is a color video camera, monochrome video camera, infrared camera or an optical camera with an infrared filter for viewing only infrared light.

9. The system of claim 1, wherein the second camera is a color video camera, monochrome video camera, infrared camera, or an optical camera with an infrared filter for viewing only infrared light.

10. The system of claim 1, wherein the second camera is an optical video camera or an optical color video camera, and the system further comprises a light source directed toward the plurality of pins to provide consistent lighting on the plurality of pins for detection on the pin deck.

11. The system of claim 10, wherein the light source is an incandescent light bulb, florescent light tube or bulb, or a light emitting light fixture.

* * * * *